(12) United States Patent
Harrison et al.

(10) Patent No.: US 9,527,753 B1
(45) Date of Patent: Dec. 27, 2016

(54) PRODUCTION OF ZINC CHLORIDE AND ZINC SULFATE FROM GEOTHERMAL BRINES

(71) Applicant: Simbol Inc., Pleasanton, CA (US)

(72) Inventors: Stephen Harrison, Benicia, CA (US); Samaresh Mohanta, San Diego, CA (US); Elizabeth Geler, San Rafael, CA (US)

(73) Assignee: Geothermal Energy Project, LLC, Miami, FL (US)

( * ) Notice: Subject to any disclaimer, the term of this patent is extended or adjusted under 35 U.S.C. 154(b) by 783 days.

(21) Appl. No.: 13/847,175

(22) Filed: Mar. 19, 2013

Related U.S. Application Data

(63) Continuation-in-part of application No. 12/766,589, filed on Apr. 23, 2010, now Pat. No. 8,741,256, and a continuation-in-part of application No. 12/880,924, filed on Sep. 13, 2010, now Pat. No. 8,454,816.

(60) Provisional application No. 61/612,808, filed on Mar. 19, 2012, provisional application No. 61/172,540, filed on Apr. 24, 2009, provisional application No. 61/241,479, filed on Sep. 11, 2009.

(51) Int. Cl.
*C01G 9/04* (2006.01)
*C01G 9/06* (2006.01)

(52) U.S. Cl.
CPC .. *C01G 9/06* (2013.01); *C01G 9/04* (2013.01)

(58) Field of Classification Search
CPC .................................. C22B 3/00; C22B 3/24
USPC .......................................... 205/43; 423/419.1
See application file for complete search history.

(56) References Cited

U.S. PATENT DOCUMENTS

| | | |
|---|---|---|
| 3,523,751 A | 8/1970 | Burkert et al. |
| 4,016,075 A | 4/1977 | Wilkins |
| 4,036,713 A | 7/1977 | Brown |
| 4,116,856 A | 9/1978 | Lee et al. |
| 4,159,311 A | 6/1979 | Lee et al. |
| 4,221,767 A | 9/1980 | Lee et al. |
| 4,291,001 A | 9/1981 | Repsher et al. |
| 4,347,327 A | 8/1982 | Lee et al. |
| 4,348,295 A | 9/1982 | Burba et al. |
| 4,348,296 A | 9/1982 | Bauman et al. |
| 4,348,297 A | 9/1982 | Bauman et al. |
| 4,376,100 A | 3/1983 | Lee et al. |
| 4,430,311 A | 2/1984 | Lee et al. |
| 4,461,714 A | 7/1984 | Burba, III |
| 4,472,362 A | 9/1984 | Burba, III |
| 4,540,509 A | 9/1985 | Burba, III |
| 4,727,167 A | 2/1988 | Burba, III et al. |
| 5,135,652 A | 8/1992 | Boateng |
| 5,219,550 A | 6/1993 | Brown et al. |

(Continued)

FOREIGN PATENT DOCUMENTS

| | | |
|---|---|---|
| EP | 1900688 A1 | 3/2008 |
| WO | 2009131628 A1 | 10/2009 |

OTHER PUBLICATIONS

Rohe et al. "Zinc Compounds", Wiley-VCH p. 743-752 (Published Online Jun. 2000).*
Walker, "Elementary Inorganic Chemistry" Geroge Bell & Sons, p. 665 (1901).*
Gooch et al. "Outlines of Inorganic Chemistry" Macmillan Company, p. 665 (1905).*

(Continued)

*Primary Examiner* — Arun S Phasge
(74) *Attorney, Agent, or Firm* — Fish & Tsang, LLP

(57) ABSTRACT

This invention relates to a method for the selective recovery of zinc from geothermal brines, and the subsequent preparation of zinc chloride or zinc sulfate therefrom.

11 Claims, 17 Drawing Sheets

(56) References Cited

U.S. PATENT DOCUMENTS

| | | | |
|---|---|---|---|
| 5,229,003 A * | 7/1993 | Duyvesteyn | C22B 3/0022 |
| | | | 210/634 |
| 5,246,684 A * | 9/1993 | Brown | C22B 3/0005 |
| | | | 423/101 |
| 5,254,225 A | 10/1993 | Gallup | |
| 5,389,349 A | 2/1995 | Bauman et al. | |
| 5,599,516 A | 2/1997 | Bauman et al. | |
| 5,919,287 A | 7/1999 | Moreau | |
| 5,951,843 A | 9/1999 | Itoh et al. | |
| 5,993,759 A | 11/1999 | Wilkomirsky | |
| 6,017,500 A | 1/2000 | Mehta | |
| 6,280,693 B1 | 8/2001 | Bauman et al. | |
| 6,458,184 B2 | 10/2002 | Featherstone | |
| 6,555,078 B1 | 4/2003 | Mehta | |
| 6,682,644 B2 | 1/2004 | Featherstone et al. | |
| 7,708,972 B2 | 5/2010 | Coustry et al. | |
| 2001/0000597 A1 | 5/2001 | Featherstone | |
| 2003/0226761 A1 | 12/2003 | Featherstone et al. | |
| 2005/0011753 A1 | 1/2005 | Jackson et al. | |
| 2007/0114134 A1 | 5/2007 | Legg et al. | |

OTHER PUBLICATIONS

Pauling "General Chemistry" Dover Publications, p. 665, (1988).*
Cole et al., "Zinc Solvent Extraction in the Process Industries," 24(2) Mineral Proc. & Extractive Metallurgy Rev (2003), pp. 91-137.
Dreisinger et al., "New Developments in the Boleo Copper-Cobalt-Zinc-Manganese Project," available at http://bajamining.com/_resources/Reports/alta_paper_2006_boleo_final.pdf.
Gotfryd et al., "Recovery of Zinc(II) from Acidic Sulfate Solutions. Simulation of Counter-Current Extraction Stripping Process," 38 Physiochemical Problems of Mineral Processing (2004), pp. 113-120.
Kawai et al., "Solvent extraction of zinc(II) and manganese(II) with 5, 10, 15, 20-tetraphenyl-21H, 23H-porphine (TPP) through the metal exchange reaction of lead(II)-TPP," 7 Solvent Extr. Res. Dev. Japan (2000), pp. 36-43.
Lee et al., "Solvent Extraction of Zinc from Strong Hydrochloric Acid Solution with Alamine 336," 30(7) Bull, Korean Chem. Soc. (2009), pp. 1526-1530.
U.S. Appl. No. 12/880,924, filed Sep. 13, 2010 (Allowed, Oct. 3, 2012).
U.S. Appl. No. 13/539,106, filed Jun. 29, 2012.

* cited by examiner

PRODUCTION OF ZINC CHLORIDE AND ZINC SULFATE FROM GEOTHERMAL BRINES

RELATED APPLICATIONS

This application claims priority to U.S. Provisional Patent Application Ser. No. 61/612,808, filed on Mar. 19, 2012, which is a continuation-in-part to U.S. patent application Ser. No. 12/766,589, filed on Apr. 23, 2010, which claims priority to U.S. Provisional Patent Application Ser. No. 61/172,540, filed on Apr. 24, 2009, and is a continuation-in-part of U.S. patent application Ser. No. 12/880,924, filed on Sep. 13, 2010, which claims priority to U.S. Provisional Patent Application Ser. No. 61/241,479, filed on Sep. 11, 2009, all of which are incorporated herein by reference in their entirety.

BACKGROUND OF THE INVENTION

Technical Field of the Invention

This invention generally relates to the field of producing zinc chloride and zinc sulfate from brines. More particularly, the invention relates to methods for the selective removal and recovery of zinc from geothermal brines that include zinc, preferably without the simultaneous removal of other ions from the brines, for the production of zinc chloride and zinc sulfate.

Description of the Prior Art

Geothermal brines are of particular interest for a variety of reasons. First, geothermal brines provide a source of power due to the fact that hot geothermal pools are stored at high pressure underground, which when released to atmospheric pressure, can provide a flash-steam. The flash-stream can be used, for example, to run a power plant. Additionally, geothermal brines contain useful elements, which can be recovered and utilized for secondary processes. With some geothermal waters and brines, binary processes can be used to heat a second fluid to provide steam for the generation of electricity without the flashing of the geothermal brine.

It is known that geothermal brines can include various metal ions, particularly alkali and alkaline earth metals, as well as silica, iron, lead, silver, zinc and manganese, in varying concentrations, depending upon the source of the brine. Recovery of these metals is potentially important to the chemical, pharmaceutical and electronics industries. Typically, the economic recovery of desired metals from natural brines, which may vary widely in composition, depends not only on the specific concentration of the desired metal, but also upon the concentrations of interfering ions, particularly silica, calcium and magnesium, because the presence of the interfering ions will increase recovery costs as additional steps must be taken to remove the interfering ions before the desired metals are recovered.

One problem associated with geothermal brines when utilized for the production of electricity results from scaling and deposition of solids. Silica and other solids that are dissolved within the geothermal brine precipitate out during all stages of brine processing, particularly during the cooling of a geothermal brine, and may eventually result in fouling of the injection wells or processing equipment.

Although conventional processing of ores and brines currently employed can be used to recover a portion of the zinc present in geothermal brines, there still exists a need to develop economic methods that are selective for the removal and recovery of zinc from the brines at high yields and high purity.

SUMMARY OF THE INVENTION

Methods for the selective removal and recovery of zinc metals and compounds from geothermal brines are provided.

In one aspect, a method for the preparation of zinc chloride from a geothermal brine solution is provided. The method including the steps of contacting a lithium chloride containing geothermal brine solution and a sodium hydroxide solution in a reaction vessel to produce a solution that includes lithium hydroxide and a hydrochloric acid by product stream, wherein the sodium hydroxide solution is prepared by electrolyzing sodium chloride in an electrochemical cell, the electrochemical cell includes an anode, a cathode, and a semi-permeable membrane separating an anode chamber and a cathode chamber. The solution that includes lithium hydroxide is contacted with carbon dioxide gas in a reaction vessel to produce a solution that includes lithium carbonate. The product stream is separated from the reaction vessel to provide a lithium carbonate product and a lithium depleted brine stream. Zinc is extracted from the lithium depleted brine stream with a solid extraction media and zinc is recovered from the solid extraction media to produce a zinc salt solution. The zinc salt solution is contacted with an alkali metal hydroxide or alkaline earth hydroxide to produce a solid zinc hydroxide and the solid is recovered. The solid zinc hydroxide is dissolved with hydrochloric acid to produce an aqueous zinc chloride solution, and the water is evaporated from the aqueous zinc chloride solution to produce a purified zinc chloride solid. The purified zinc chloride solid has a purity of at least about 99% by weight.

In certain embodiments, the step of contacting the zinc salt solution with an alkali metal hydroxide or alkaline earth hydroxide can include contacting the zinc salt solution with between about 0.9 and 0.95 hydroxide equivalents. In certain embodiments, the alkaline earth hydroxide is calcium hydroxide. In certain embodiments, the concentration of the calcium hydroxide is between about 3.25 g/L and 3.75 g/L. In certain embodiments, the concentration of the calcium hydroxide is between about 3.45 g/L and 4.25 g/L.

In another aspect, a method for preparing zinc sulfate from a geothermal brine solution is provided. The method includes the steps of contacting a lithium chloride containing geothermal brine solution and a sodium hydroxide solution in a reaction vessel to produce a solution that includes lithium hydroxide and a hydrochloric acid by product stream, wherein the sodium hydroxide solution is prepared by electrolyzing sodium chloride in an electrochemical cell, the electrochemical cell includes an anode, a cathode, and a semi-permeable membrane separating an anode chamber and a cathode chamber. The solution that includes lithium hydroxide is contacted with carbon dioxide gas in a reaction vessel to produce a solution that includes lithium carbonate. The product stream is separated from the reaction vessel to provide a lithium carbonate product and a lithium depleted brine stream. Zinc is extracted from the lithium depleted brine stream with a solid extraction media and zinc is recovered from the solid extraction media to produce a zinc salt solution. The zinc salt solution is contacted with an alkali metal hydroxide or alkaline earth hydroxide to produce a solid zinc hydroxide and the solid is recovered. The solid zinc hydroxide is dissolved with sulfuric acid to produce an aqueous zinc sulfate solution; and the water evaporated from the aqueous zinc sulfate solution to produce a purified zinc sulfate solid, the purified zinc sulfate solid having a purity of at least about 99% by weight.

In certain embodiments, the step of contacting the zinc salt solution with an alkali metal hydroxide or alkaline earth hydroxide includes contacting the zinc salt solution with between about 0.9 and 0.95 hydroxide equivalents. In certain embodiments, the alkaline earth hydroxide is calcium hydroxide. In certain embodiments, the concentration of the calcium hydroxide is between about 3.25 g/L and 3.75 g/L. In certain embodiments, the concentration of the calcium hydroxide is between about 3.45 g/L and 4.25 g/L.

DETAILED DESCRIPTION OF THE INVENTION

Figure 1:
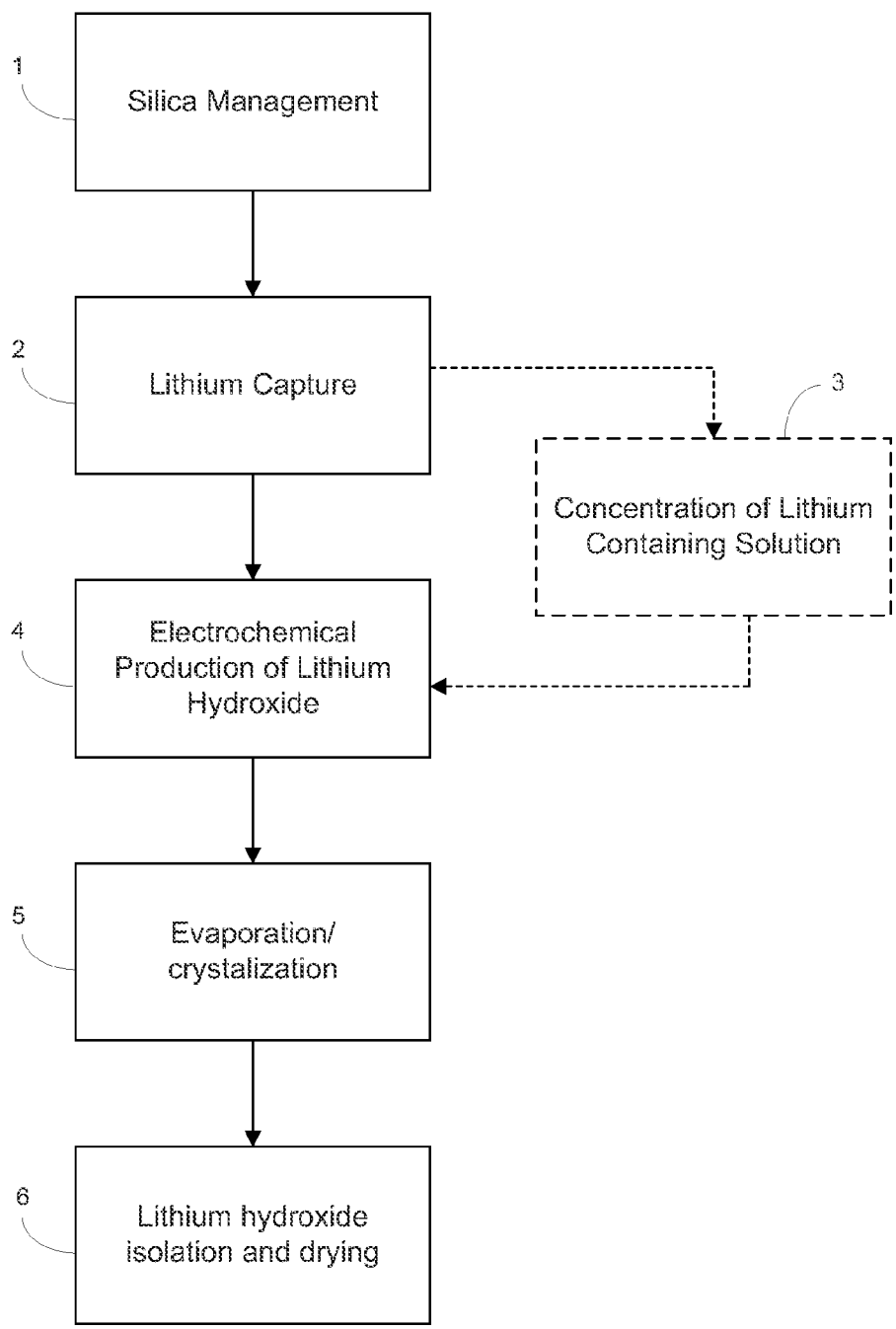
FIG. 1 is a flow chart of the steps of a method for the production of lithium hydroxide from a geothermal brine according to one embodiment of the invention.

Broadly, described herein are methods for the selective removal of zinc from solution. As used herein, the selective removal of zinc generally refers to methods to facilitate the removal of zinc from solutions that include zinc, such as geothermal brines, without the removal of other ions. Generally, in certain embodiments, the methods employ chemical means for the separation of zinc from brines. In certain embodiments, the methods may include physical means, as well as chemical means, for the separation of zinc from brines. In certain embodiments, the step for recovering zinc can be done prior to, or after, the removal and recovery of manganese from the solution.

As used herein, "brine" or "brine solution" refers to any aqueous solution that contains a substantial amount of dissolved metals, such as alkali and/or alkaline earth metal salt(s) in water, wherein the concentration of salts can vary from trace amounts up to the point of saturation. As used herein, brine refers to both geothermal brines and waste or byproduct streams from industrial processes.

Generally, brines suitable for the methods described herein are aqueous solutions that may include alkali metal or alkaline earth chlorides, bromides, sulfates, hydroxides, nitrates, and the like, as well as natural brines. In certain brines, metals may be present. Exemplary elements present in the geothermal brines can include sodium, potassium, calcium, magnesium, lithium, strontium, barium, iron, boron, silica, manganese, chlorine, zinc, aluminum, antimony, chromium, cobalt, copper, lead, arsenic, mercury, molybdenum, nickel, silver, thallium, vanadium, and fluorine, although it is understood that other elements and compounds may also be present. Brines can be obtained from natural sources, such as, Chilean brines or Salton Sea brines, geothermal brines, sea water, mineral brines (e.g., lithium chloride or potassium chloride brines), alkali metal salt brines, and industrial brines, for example, industrial brines recovered from ore leaching, mineral dressing, and the like. The method is also equally applicable to artificially prepared brine or salt solutions.

Silica Removal

In some embodiments of the present invention, the process first removes silica and iron from the brine solution in an iron/silica removal step. In certain embodiments, the iron and silica removal step preferably removes only the iron and silica, while at the same time leaving all other metals and/or ions present in the brine undisturbed. The removal of silica is an important step as the presence of silica can interfere with subsequent processes for the recovery of various other metals. For example, silica frequently clogs pores in filtration media.

One preferred method for the selective removal of silica and iron includes contacting the solution with iron (III) hydroxide at a pH of between about 4.5 and 6, preferably between about 4.75 and 5.5, more preferably between about 4.9 and 5.3.

Typically, brine will have an iron (II) salt present naturally. In other embodiments, an iron (II) salt or iron (III) hydroxide can be added to the brine to achieve a certain concentration of iron (II) salt or iron (III) hydroxide relative to the silica or silicon containing compounds present in the brine. In certain embodiments, the molar ratio of the iron (II) salt or iron (III) hydroxide to silica is at least 1:1, preferably at least 4:1, more preferably at least 7:1 and even more preferably at least 10:1.

When the iron in the brine or silica containing solution is iron (II), for example iron (II) chloride, an oxidant is added to oxidize iron (II) salt to iron (III) hydroxide. The preferred oxidant is air. Thus, in one preferred embodiment, the iron (II) salt present in the brine can be oxidized to iron (III) by sparging the reaction vessel with air. While it is understood that many different oxidants can be used for the oxidation of iron (II) to iron (III), the use of oxygen or air as the oxidant in the pH range of between 4 and 7 is selective for the oxidation of the iron (II) salt to iron (III) hydroxide, and generally does not result in the precipitation or oxidation of other elements or compounds that are present in the brine. Control of the pH of the solution can be achieved with the addition of base (e.g., calcium hydroxide, calcium oxide or the like). As noted previously, it is preferred that the pH is maintained between 4.5 and 6.

Other exemplary oxidants can include hypohalite compounds, such as hypochlorite, hydrogen peroxide (in the presence of an acid), air, halogens, chlorine dioxide, chlorite, chlorate, perchlorate and other analogous halogen compounds, permanganate salts, chromium compounds, such as chromic and dichromic acids, chromium trioxide, pyridinium chlorochromate (PCC), chromate and dichromate compounds, sulfoxides, persulfuric acid, nitric acid, ozone, and the like. It will be recognized by those skilled in the art that iron (III) hydroxide may also have a significant affinity for arsenic (III) and (V) oxyanions, and these anions, if present in the brine, may be co-deposited with the silica on the iron (III) hydroxide.

In another embodiment, iron (III) hydroxide can be produced by adding a solution of iron (III) chloride to the brine, which on contact with the more neutral brine solution, will precipitate as iron (III) hydroxide. The brine may require neutralization, such as through the addition of base to initiate precipitation of the iron (III) hydroxide.

The iron (III) hydroxide contacts the silica present in the brine and forms a precipitate. Without being bound to any specific theory, it is believed that the silica or silicon containing compound attaches to the iron (III) hydroxide. In certain embodiments, the ratio of iron (III) to silica is at least about 1:1, more preferably at least about 4:1. The reaction of the iron (III) hydroxide with silica is capable of removing at least about 80% of the silica present, preferably at least about 90%, and more preferably at least about 95%, and typically depends upon the amount of iron (III) hydroxide present in the solution.

In certain embodiments, the iron (II) salt containing solution can be sparged with air for a period of at least 15 min., preferably at least 30 min., followed by the addition of a base, such as an alkali hydroxide or alkaline earth hydroxide such as calcium hydroxide, sodium hydroxide, or the like, or calcium oxide, to achieve the desired pH for the solution.

Lithium Removal

In certain embodiments, following the removal of silica, lithium can be removed prior to the recovery of zinc (not shown in FIG. 1).

As shown in FIG. 1, in one embodiment, the method for lithium removal can generally include a step of providing a lithium chloride containing solution, such as for example, a geothermal brine, a silica removal step, a lithium chloride extraction step, an optional lithium chloride concentration step, an electrochemical lithium hydroxide production step, an evaporation step, and a lithium hydroxide isolation and drying step.

The present methods include the preparation and recovery of lithium carbonate from solutions that include monovalent cations, including lithium, multivalent cations, monovalent anions, and multivalent anions.

Referring to FIG. 1, provided herein is a multistep method for the isolation of lithium ions from a brine or other lithium containing solution and the subsequent production of lithium carbonate therefrom. In a first step of the method, the brine is supplied to a silica management step 1, wherein silica is removed from the brine to produce a silica-free brine or lithium containing solution. In a second step 2 of the method, lithium ions are removed from the silica-free brine or lithium containing solution. Optionally, in a third step 3, the lithium ion containing solution from the second step may be concentrated to produce a concentrated lithium ion containing solution. In a fourth step 4, the lithium containing solution is supplied to an electrochemical cell to produce a lithium hydroxide containing solution. In a fifth step 5, water can be removed from the lithium hydroxide containing solution from step 4 to crystallize at least a portion of the lithium hydroxide from step 4. In a sixth step 6, the lithium hydroxide is isolated, recovered, and dried.

Figure 2:
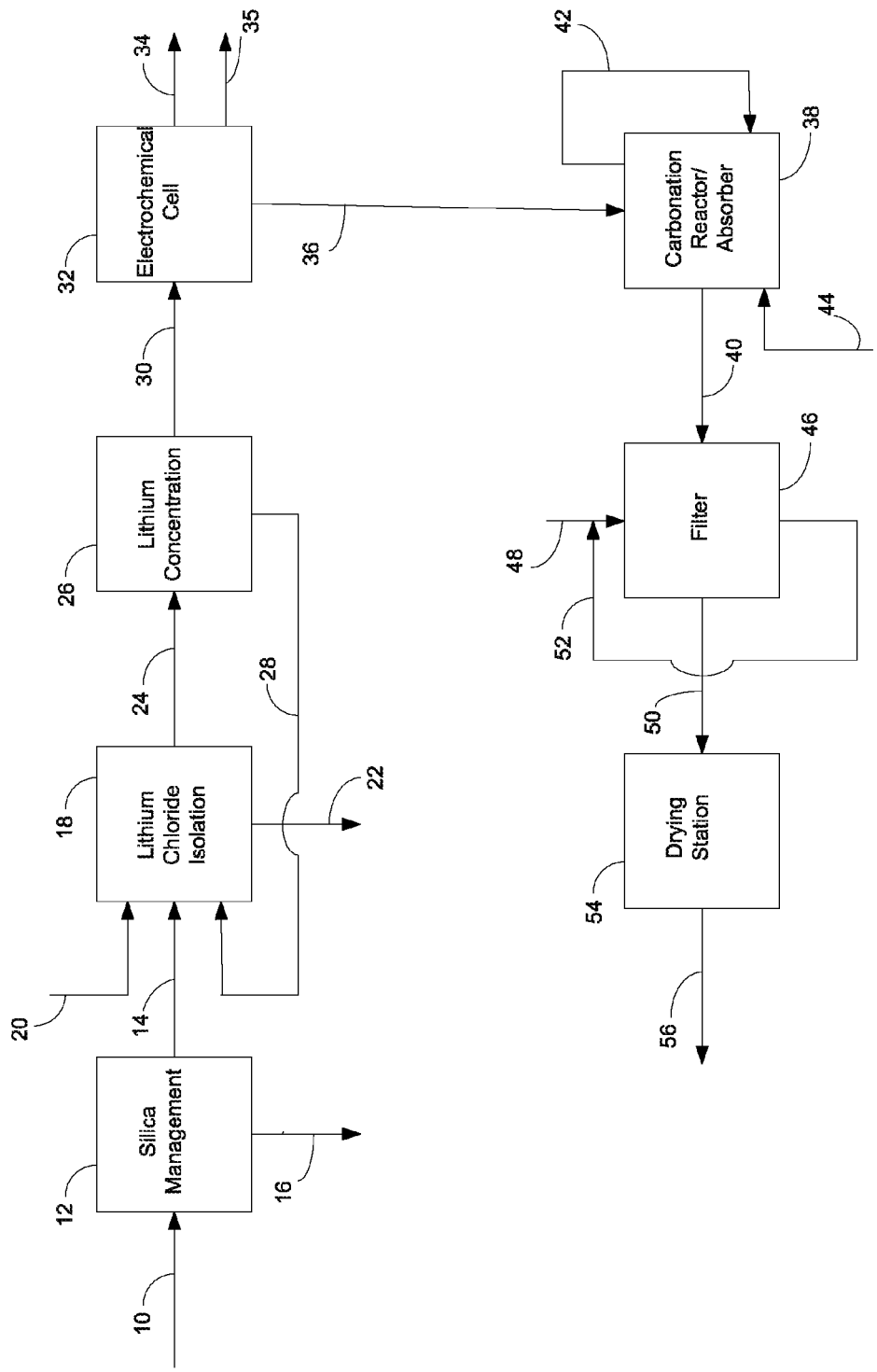
FIG. 2 is a schematic diagram of one embodiment of an apparatus for the production of lithium carbonate from a geothermal brine according to one embodiment of the invention.

Referring to FIG. 2, in one embodiment of the present method, lithium chloride containing solution 10 is provided. As noted above, lithium chloride containing solution 10 can be obtained from a variety of sources, including geothermal brines. The lithium chloride containing solution is supplied to silica management step 12, which operates to significantly reduce the amount of silica that may be present in lithium chloride containing solution 10, such that silicate precipitate 16 and silica-lean lithium chloride containing solution 14 are produced. Preferably, after the silica management step, the silicon concentration in silica-lean lithium chloride containing solution 14 is less than about 150 ppm, more preferably the concentration is less than about 100 ppm, even more preferably the concentration is less than about 50 ppm, and even more preferably the concentration is less than about 25 ppm. In certain embodiments, the concentration of silicon in silica-lean lithium chloride containing solution 14 is less than about 20 ppm, less than about 10 ppm, or even less than about 5 ppm. It is understood that the silica management step may be omitted from the process for brines that do not include silica, or brines that have a substantially low initial silica concentration.

As known in the art, various membranes can be used to selectively remove specific undesired ions from lithium containing solution 14.

Silica-lean lithium chloride containing stream 14, which is substantially free of silica (measured as SiO2), can be supplied to lithium chloride isolation step. In certain embodiments, silica-lean lithium chloride containing stream 14 can be supplied to at least one intercalated lithium absorbent column 18, which can be configured to absorb and isolate lithium chloride from the silica-lean lithium chloride containing solution, while at the same time allowing other ions, such as calcium, magnesium, and/or sodium, or the like, to pass with water stream 22, through the use of a selective molecular sieve, membrane, or other like materials. In embodiments that include more than one intercalated lithium absorbent column, the bulk of the lithium can be removed in the first intercalated lithium absorbent column, with any subsequent "polishing" intercalated lithium absorbent columns being used to minimize overall lithium loss during the recovery process.

In certain embodiments, the intercalated lithium absorbent column can be operated as follows. Lithium alumina intercalate particles having an average diameter of between about 100 and 150 μm can be combined with a saturated sodium chloride solution that includes approximately 200 ppm lithium chloride to prepare a slurry, which can then be added to the column. The column may be jacketed, insulated or may include means to provide heating or cooling to the column. The column may include a method of distributing liquid and support for the extraction media and can include fritted ends having a pore size of between approximately 25 and 50 μm, although other like means, such as supports of glass wool or perforated plates, can also be used instead of fritted ends. For the present invention, the operating temperature of the column can be maintained at a temperature that is greater than room temperature, and is preferably maintained at a temperature above about 70° C., more preferably between about 95° C. and 110° C.

The column is maintained wet and is unloaded before the first use by circulating at least about 1 bed volume, preferably about two bed volumes, of deionized water 20 that includes approximately 1000 ppm lithium chloride, at a flow rate of between approximately 1 and 4 bed volumes/hour, preferably between about 1.5 and 2.5 bed volumes/hour. The column is then contacted with approximately one bed volumes of saturated sodium chloride solution containing approximately 200 ppm lithium chloride is then run.

During loading of the column (i.e., during the step of capturing desired lithium chloride), high ionic strength solution 14 containing lithium chloride is supplied to column 18 and the lithium concentration of the effluent at column outlet 22 is measured to determine the point at which the column becomes saturated with the lithium chloride. During the lithium ion capture step, the lithium concentration at outlet 22 remains fairly constant and relatively low, for example, approximately 0 and 100 ppm. The point at which column 18 reaches or nears the point of saturation with lithium ions, however, the concentration of the lithium in the effluent increases, thus indicating that the column has either little or no capacity for additional lithium ions. Upon reaching this point of saturation, flow of the solution that includes lithium chloride to column 18 is stopped, and the column is flushed with between about 1 and 8 bed volumes of deionized water, preferably between about 1 and 2.5 bed volumes, and most preferably between about 1 and 1.5 bed volumes, to produce a lithium chloride-rich stream 24. It is understood that the apparatus can include various valves and control devices for controlling the flow of the lithium containing solution or the wash solution to the column.

In certain embodiments, after loading of the column, but before collection of the captured lithium chloride, the column may be flushed with about 1 bed volume of a 26% saturated sodium chloride solution that includes about 200 ppm lithium chloride.

After the removal of lithium chloride from the lithium containing feed stream during the lithium chloride isolation step, intercalated lithium absorbent columns 18 can be regenerated and the lithium chloride recovered therefrom. Specifically, at least about 0.5 equivalents of wash water 20 may be supplied to column(s) 18 to remove absorbed lithium chloride and produce lithium chloride rich solution 24. In certain embodiments, between about 1 to 2 equivalents of wash water 20, or more equivalents, may be used during the regeneration of the columns. In preferred embodiments, the wash water may include lithium ions for the regeneration of the columns. Optionally, low ionic strength liquids, such as alcohols and water/alcohol mixtures can be used to regenerate the columns. In general, the amount of water utilized from the lithium chloride recovery from the column is minimized by recycling the product streams to maximize lithium content, without affecting the capacity of the extracting media.

Optionally, a purification step can be employed to remove calcium, magnesium, or other divalent ions such as zinc and manganese that may be present in lithium chloride-rich stream 24. Removal of calcium, magnesium, and/or other alkaline earth metals can be achieved by known means, such as, by increasing the pH and treating the solution with ion exchange, preferably using selective chelating ion exchange resins, or by the addition of a base, such as lime, sodium hydroxide, lithium hydroxide, or the like, followed by the addition of lithium carbonate, sodium carbonate, potassium carbonate, ammonium carbonate, or other suitable carbonate, which can precipitate magnesium and iron hydroxide, as well as calcium carbonate. In alternate embodiments, ion exchange means can be employed to facilitate the removal of calcium, magnesium, and/or other alkaline earth metals. Other bases, such as sodium hydroxide and other hydroxides of alkali metals, can also be used. In certain brines, it may be beneficial to remove boron from the product stream at this point in the process by known means, such as by precipitation, solvent extraction, or ion exchange.

Lithium chloride-rich stream 24 may have a concentration of between about 1% and 42% by weight, preferably greater than about 10% by weight, more preferably greater than about 25% by weight. In alternate embodiments, lithium chloride-rich stream 24 may have a concentration of greater than about 10% by weight.

In certain embodiments, lithium chloride containing solution 24 can optionally undergo a purification or concentration step prior to being provided to electrolytic process 32. Methods for the isolation and purification of lithium chloride from brines, including geothermal brines, are known in the art, for example, as described in U.S. Pat. Nos. 4,036,713 and 5,951,843, each of which is herein incorporated by reference in its entirety.

Optionally, the process can include steps for increasing the concentration of the lithium chloride stream. Specifically, lithium concentration means 26 can be utilized for the removal of a portion of the water in the lithium chloride stream, for example, by evaporation, thereby producing a more concentrated lithium chloride solution 30. Exemplary concentration means can include electro dialysis, steam evaporation, or solar evaporation. Water 28 removed from the lithium chloride containing solution can be recovered, for example by evaporation and subsequent condensation, and resupplied to intercalated lithium absorbent column(s) 18, or can be supplied to any other step in this or an associated process that requires the supply of water. Alternatively, water 28 can be supplied to a geothermal well. In embodiments employing a concentration step, overall concentration of concentrated lithium chloride-rich solution 30 can be increased to greater than 25% lithium chloride by weight, preferably up to about 40% lithium chloride by weight.

Concentrated lithium chloride-rich solution 30 can be supplied to electrochemical cell 32, which includes at least one anode, one cathode and a permeable membrane, for the electrochemical preparation of lithium hydroxide. Electrochemical cells suitable for large scale production are commercially available from companies, such as, DeNora, Chlorine Engineers, and Asahi Glass, to name a few. Specifically, chloride ions are oxidized to chlorine at the anode and water is reduced to hydroxide ions and hydrogen gas at the cathode. Preferably, concentrated lithium chloride-rich solution 30 is substantially free of other ions, particularly ions that may interfere with the electrochemical reaction. Optionally, a lithium chloride-rich stream can supplied directly to the electrochemical reaction, without being first being subjected to the silica management and lithium ion sequestration steps, provided that the lithium chloride-rich stream is substantially free of non-lithium ions, particularly non-lithium ions that may interfere with the electrochemical reaction. In certain embodiments, the concentration of sodium and/or potassium ions in concentrated lithium chloride-rich solution 30 is less than about 5% by weight, preferably less than about 3% by weight. Cations such as iron, calcium, magnesium, and the like, if at all present, preferably have a total concentration of less than about 0.001% by weight, more preferably less than about 0.005% by weight, and even more preferably less than about 0.00001% by weight. Higher concentrations of the interfering ions does not necessarily preclude operation of the electrochemical cell, but instead may reduce the overall life of the cell components and/or the overall effectiveness of the reaction.

Similar to that which is noted above with respect to the presence of non-lithium interfering cations, electrochemical cell 32 preferably has a total non-chloride anion content of less than about 5% by weight, preferably less than about 3% by weight, and even more preferably less than about 1% by weight.

The cathode of electrochemical cell 32 can be any suitable material, including nickel, catalyzed nickel mesh, stainless steel, coated stainless steel, mild steel, and the like. Other exemplary catalysts can include mixed ruthenium compounds, platinum and other similar compounds that have low hydrogen over potential. The total area of the cathode can be adjusted based upon reactor size and desired production. The catholyte feed of the electrochemical cell 32 can be any suitable material having sufficient ions to carry a current. While water may be employed, and in certain embodiments, the addition of lithium carbonate or lithium hydroxide may be beneficial to the operation of the cell.

The anode of electrochemical cell 32 can be any suitable material, such as titanium mesh coated with ruthenium oxide, titanium mesh coated with platinum, carbon, or the like. Preferably, the anode is a dimensionally stable anode, allowing for reduced power consumption. Dimensionally stable titanium anodes are particularly well-suited for chlorine environments as the titanium substrate is resistant to corrosion. The total area of the anode can be adjusted based upon reactor size and desired production. The anolyte of electrochemical cell 32 can be any suitable material, including a lithium chloride solution having a concentration of between of about 1% by weight to saturation, preferably between 5% and 40% by weight, more preferably between about 10% and 35% by weight.

The materials for construction of electrochemical cell 32 can be any material that is chemically resistant to chlorine, activated chlorine, oxygenated chlorine species, and other dissolved species that may exist in brine solutions. Exemplary materials for the construction of electrochemical cell 32 include polytetrafluoroethylene (PTFE), polyvinylidene fluoride (PVDF), HALAR (alternating co-polymers of ethylene and chlorotrifluoroethylene (CTFE)), and other fluorinated or partially fluorinated.

The membrane of electrochemical cell 32 can be any suitable semi-permeable cation selective membrane that selectively passes cations and inhibits the passage of anions. Such membranes are known in the art. One exemplary membrane is Nafion (E.I. DuPont de Nemours & Co.), particularly the Nafion 300, 400 and 900/9000 series of materials. Other suitable membranes can be supplied by Flemion, however any suitable membrane material can be used provided the material is chemically resistant to both chlorine and lithium hydroxide. The membrane may be placed between the anolyte being electrolyzed and the catholyte.

In certain embodiments, the process can optionally include one or more filter or separation-purification step prior to the step of supplying concentrated lithium chloride solution 30 or brine to electrochemical cell 32.

During operation of electrochemical cell 32, a current density of between about 500 and 10,000 $A/m^2$ can be applied at a voltage of between about 1.5 and 5 volts. Preferably, a current density of between about 2000 and 7000 $A/m^2$ is applied.

Electrochemical cell 32 may be operated at a temperature of between about 60° and 100° C., preferably between about 70° and 95° C., and more preferably between about 90° and 95° C. Cell 32 can be operated at atmospheric pressure, or slightly above atmospheric pressure.

Operation of electrochemical cell 32 produces lithium hydroxide in solution, and also evolves chlorine and hydrogen gas by products, which can be removed from the electrochemical cell via lines 34 and 35, respectively.

The efficiency of electrochemical cell 32 is at least about 60%, preferably at least about 70%, more preferably at least about 80%, more preferably at least about 90%, more preferably at least about 95%, and even more preferably at up to about 99.9%. The electrolysis can be operated continually until the lithium hydroxide content reaches about 17% by weight, at which time the lithium hydroxide solution may be removed and supplied to a carbonation reactor. At lithium hydroxide concentrations greater than about 17% by weight, the lithium hydroxide in solution can begin to precipitate. Electrochemical cell 32 can also be operated under conditions designed to produce lower concentration lithium hydroxide solutions and the lower concentration lithium hydroxide solution can be recycled to and from the carbonation reactor. In certain embodiments, electrochemical cell 32 can also include a feed line (not shown) for supplying water, low concentration lithium hydroxide, low concentration lithium carbonate, or combinations thereof to the cell. Lithium hydroxide can be removed from electrochemical cell 32 via line 36.

In certain embodiments, lithium hydroxide solution 36 can be supplied from electrochemical cell 32 to carbonation reactor/absorber 38 and can be contacted with carbon dioxide gas 44, for example, in an up-flow fashion. Carbonation reactor/absorber 38 can include a series of trays or other like means that are designed to allow lithium hydroxide 36 to be supplied to the top of the reactor and flow in a downward fashion through the reactor, thereby contacting up-flowing carbon dioxide gas 44, which can be introduced near the bottom of carbonation reactor/absorber 38. In alternate embodiments, carbonation reactor/absorber 38 can include various mixing means designed to facilitate mixing of liquids and gases. Optionally, carbonation reactor/absorber 38 can be a jacketed batch reactor having thermostatic heating. The reaction produces lithium carbonate solid. The concentration of the lithium carbonate slurry is preferably at least about 1.5% by weight lithium carbonate, more preferably at least about 6% by weight lithium carbonate. Carbon dioxide can be captured and recycled to carbonation reactor/absorber 38 via line 42.

In certain embodiments, the lithium carbonate is produced by reaction of lithium hydroxide with sodium carbonate in water, wherein the mixture is heated, preferably to a temperature of between about 90° C. and 95° C., with stirring. The reaction produces solid lithium carbonate and a sodium chloride solution, wherein the sodium chloride solution can be separated by filtration from the desired lithium carbonate solids.

Lithium carbonate solution 40 can be supplied to filtration means 46, which is operable to separate lithium carbonate containing slurry 40 into water stream 52, which may optionally be resupplied to the filtration means, and solid lithium carbonate product 50. Filtration means 46 can, for example, include a series of screens or filters and water supply 48. Optionally, water can be recycled to the process via line 52. Optionally, lithium carbonate can be concentrated from the slurry by centrifugation or decantation thickening. Water collected during the separation of the solids from the slurry via filtration means 46 can be supplied to the electrochemical cell, or may be supplied to a geothermal well or reservoir. In certain embodiments, lithium carbonate solid can be retained on a band filter and supplied to a wash step, wherein hot water, preferably having a temperature of between about 90° C. and 95° C. is used to wash the solids. In certain embodiments, the aqueous solution collected via filtration means 46 can have a pH of greater than about 9, most likely having a pH between about 10-12. Alternatively, sufficient acid can be added to the aqueous solution to achieve a pH of between about 5 and 8.5, and the acidified water can then be supplied to the intercalated lithium absorbent column(s). Alternatively, the solution can be returned directly to the cathode side of the electrolysis cell without prior neutralization.

The solid lithium carbonate 50 is supplied to a drying station 54, which can optionally include heating means, as well as lines for supplying nitrogen or other inert gases, to the chamber. Dried lithium carbonate product 56 can then be collected, packaged, and transported for further use.

Figure 3:
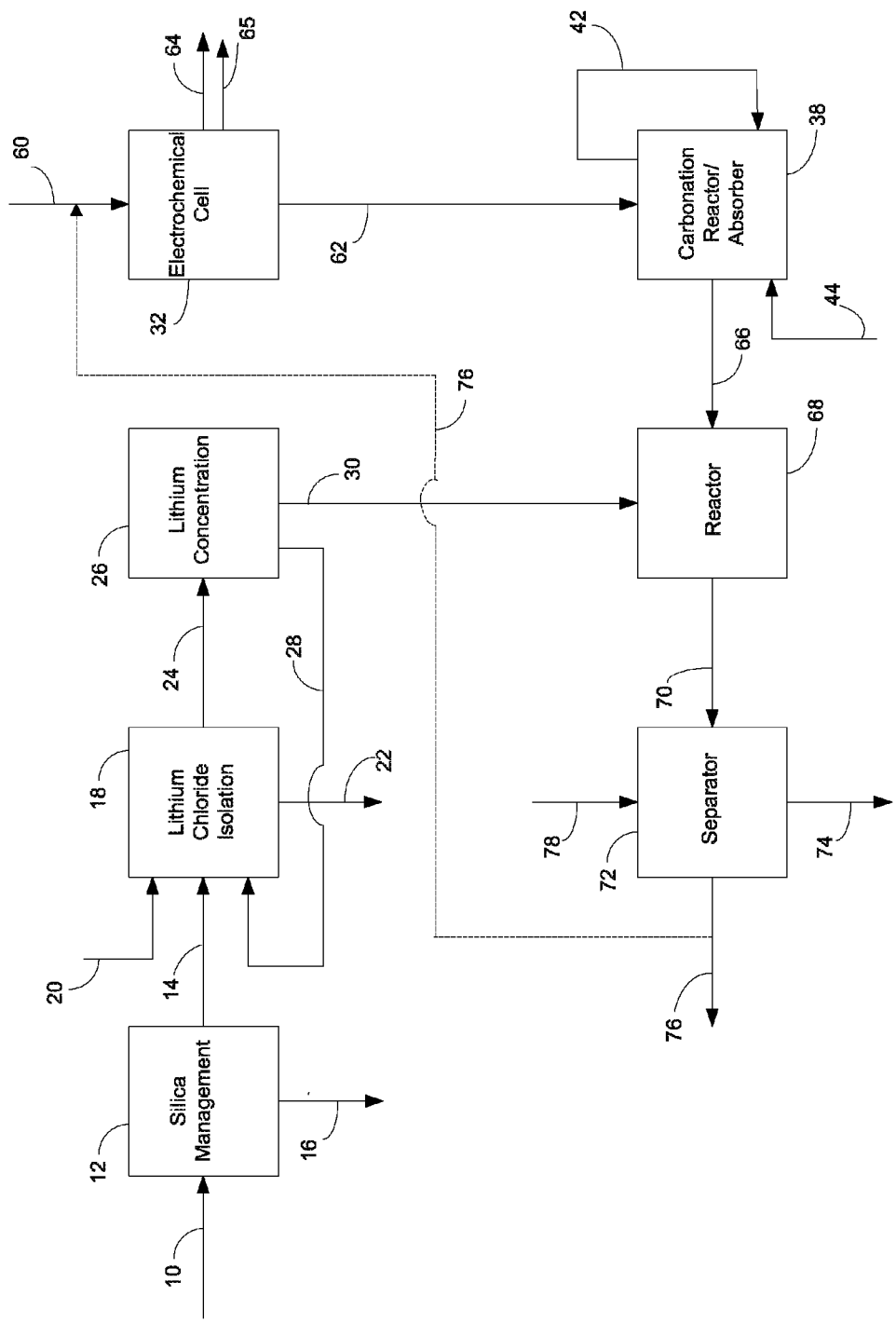
FIG. 3 is a schematic diagram of one embodiment of an apparatus for the production of lithium carbonate from a geothermal brine according to one embodiment of the invention.

Referring now to FIG. 3, an alternate embodiment for the production of lithium carbonate is provided. Lithium chloride stream 30 is provided by the process described above and as shown in FIG. 2. To electrochemical cell 32, which is as described above, sodium chloride stream 60 can be provided. Sodium chloride stream 60 is then subjected to electrolysis to produce sodium hydroxide stream 62 and chlorine and hydrogen gases 64. Reaction conditions for the production of sodium hydroxide by electrolysis of sodium chloride are known in the art.

In certain embodiments, the efficiency of the electrolysis of sodium chloride is at least about 70%, alternatively at least about 80%, alternatively at least about 90%, or alternatively at least about 95%. In certain embodiments, sodium hydroxide solution 62 is produced in at a concentration of at least about 10% by weight, more preferably at least about 30% by weight, and most preferably about 35% by weight.

Chlorine and hydrogen gases 64, 65 from electrochemical cell 32 can be combusted and scrubbed with water to generate hydrochloric acid, which may be used within the process, or alternately may be purified, compressed, and sold commercially. In certain embodiments, the hydrochloric acid generated by the processes described herein can be used for a subsequent process, such as the production of zinc chloride from zinc hydroxide, as provided herein.

Sodium hydroxide stream 62 is supplied to carbonation reactor/absorber 38, wherein the sodium hydroxide stream is contacted with carbon dioxide stream 44, for example, in an up-flow fashion. Carbonation reactor/absorber 38 can include a series of trays, designed to allow sodium hydroxide stream 62 to be supplied to the top of the reactor and flow in a downward fashion through the reactor, thereby contacting up flowing carbon dioxide gas 44, which can be introduced near the bottom of the reactor, to produce sodium carbonate solution or slurry 66. In alternate embodiments, carbonation reactor/absorber 38 can include various mixing means designed to facilitate mixing of liquids and gases. The concentration of the solution is preferably at least 15% by weight sodium carbonate, more preferably at least 25% by weight sodium carbonate. Carbon dioxide can be captured and recycled to carbonation reactor/absorber 38 via line 42.

Sodium carbonate solution 66 is supplied to reaction vessel 68 wherein the solution is contacted with lithium chloride solution 30 to produce slurry 70, which includes lithium carbonate and sodium chloride solution. The step of contacting sodium carbonate solution 66 and lithium chloride solution 30 in the reaction vessel can be at a temperature greater than about 60° C., preferably greater than about 80° C., and even more preferably between about 90° C. and 95° C. In certain embodiments, reaction vessel 68 can be a stirred tank reactor. Alternatively, reaction vessel 68 can be a standard crystallizer. Lithium carbonate is present as a precipitate, while sodium chloride remains in aqueous solution.

Slurry 70, which includes solid lithium carbonate and aqueous sodium chloride, is supplied to separator 72, which can include various means for the separation of solids from liquids including, for example, centrifuge, settling tank, filters, screens, and the like, to produce lithium carbonate product stream 74 and sodium chloride brine solution 76. In order to attain improved product quality, the lithium carbonate can be treated to remove sodium, potassium, and/or chloride ions trapped in the interstitial space of the lithium carbonate precipitate, such as by washing with water, preferably hot water, or by like means. In certain embodiments, separator means 72 can be a band filter or rotary drum, and can optionally be fed through a counter current wash system for the removal of residual sodium chloride. Separator means 72 can also include water inlet 78 and outlet 76 for the washing of the separated solid lithium carbonate. Separator means 72 can also include means for drying and/or the removal of water from the solid lithium carbonate, including for example, centrifuge, heaters, blowers, presses, and the like. Separator means 72 can include a vacuum filter for removal of water. In certain embodiments, it is desirable to optimize the washing step to both maximize purity of the lithium carbonate while minimizing the amount of water used for washing. Sodium chloride solution 76 can be recycled to electrochemical cell 32 for electrolysis. Lithium carbonate product 74 can have a moisture content of less than about 5% by weight, preferably less than about 2% by weight, and even more preferably less than about 0.5% by weight.

The brine solution 76 from separator means 72 can include sodium chloride and lithium carbonate. Generally, depending upon the amount of water utilized in the process and during the wash process, the ratio of sodium chloride to lithium carbonate is at least about 20:1, more preferably at least about 25:1, and even more preferably at least 30:1. In certain embodiments, the ratio of sodium chloride to lithium carbonate in the brine solution can be about 35:1.

In certain embodiments, brine solution 76 can be acidified with hydrochloric acid (not shown) to a pH of less than about 4, preferably about 3, and recycled to electrochemical cell 32. The hydrochloric acid can be supplied from electrochemical cell 32.

The lithium carbonate production method proposed in FIG. 3 is advantageous, in part, because the process eliminates, or nearly eliminates, the production of waste products. Specifically, in certain embodiments, the recycle of unused metal salts, for example sodium chloride, and carbon dioxide, the overall yield can be quantitative or nearly quantitative.

Figure 4:
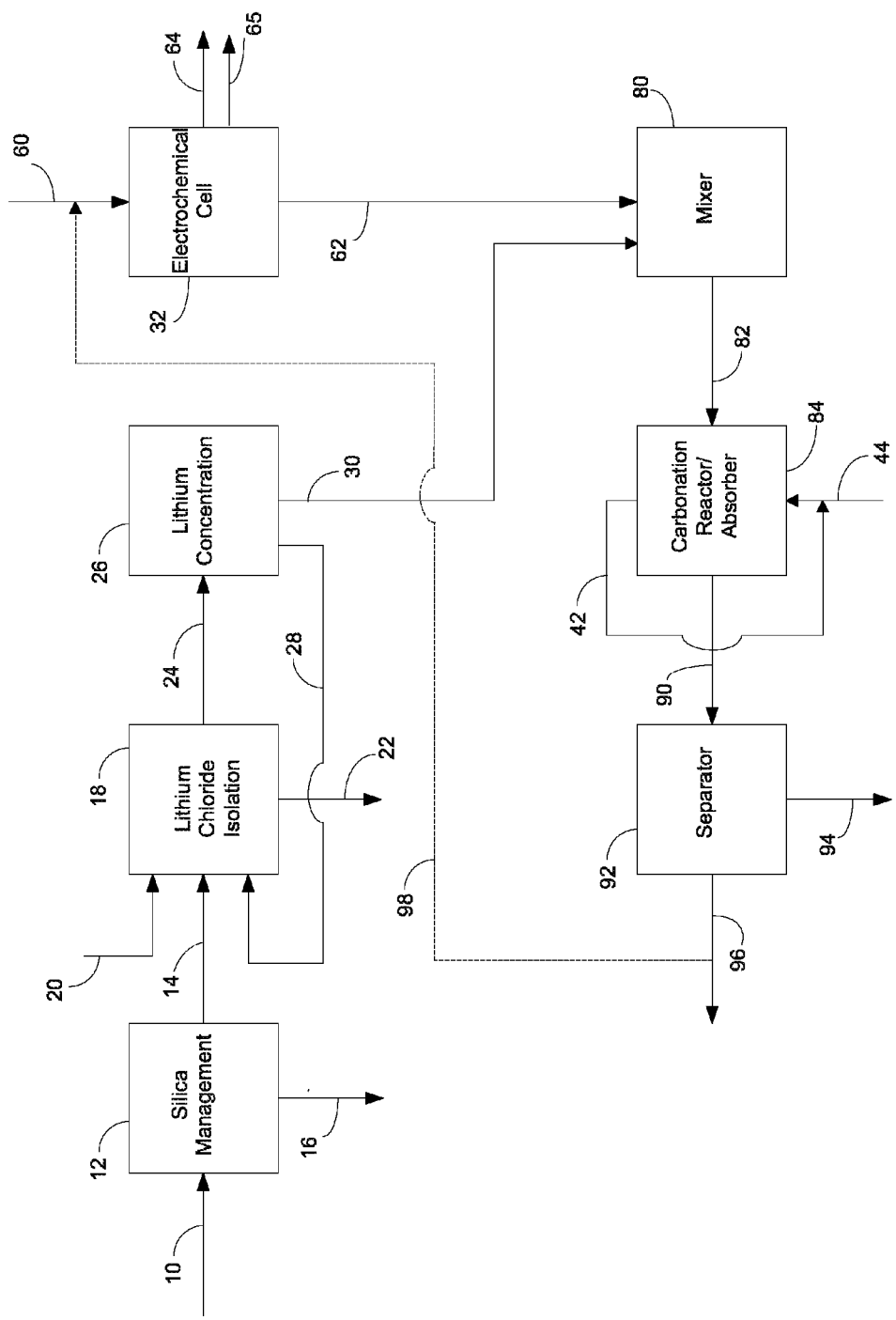
FIG. 4 is a schematic diagram of one embodiment of an apparatus for the production of lithium carbonate from a geothermal brine according to one embodiment of the invention.

Referring now to FIG. 4, an alternate embodiment for the production of lithium carbonate is provided. The method is a single step process wherein sodium carbonate is produced and reacted with recovered lithium chloride, however may require additional input and produces a waste lithium chloride stream that may include small amounts of lithium carbonate entrained therein.

A lithium chloride stream is provided as described above and as shown in FIG. 2. To electrochemical cell 32 sodium chloride stream 60 is provided. Sodium chloride stream 60 is subjected to electrolysis to produce sodium hydroxide 62 and chlorine and hydrogen gases 64, 65, respectively.

Sodium hydroxide stream 62 is supplied to mixer 80, wherein the sodium hydroxide stream is combined and mixed with lithium chloride stream 30. Mixing of sodium hydroxide stream 62 and lithium chloride stream 30 can be by known means, such as by agitators or mixers, with ultrasonic waves, or by the like. Mixer 80 produces mixed stream 82, which includes sodium hydroxide and lithium chloride in aqueous solution. In certain embodiments, it may be preferred that lithium chloride steam 30 has a concentration of at least about 20% by weight, more preferably at least about 28% by weight, and even more preferably about 42% by weight. Similarly, in certain embodiments, it may be preferred that sodium hydroxide stream 62 has a concentration of at least about 15% by weight, more preferably at least about 25% by weight, and even more preferably about 35% by weight.

Mixed stream 82 is supplied to carbonation reactor/absorber 84, which can include a series of trays, designed to allow the mixed stream, which includes lithium chloride and sodium hydroxide, to be supplied to the top of the reactor and flow in a downward fashion through the reactor, thereby allowing the mixed stream to sufficiently contact up-flowing carbon dioxide gas 44, which can be introduced near the bottom of the reactor via line 22, to produce a lithium carbonate slurry 90. Preferably, carbonation reactor/absorber 84 is maintained at a temperature of between about 90° C. and 100° C. In alternate embodiments, reactor 84 can include various mixing means designed to facilitate mixing of liquids and gases. The concentration of the lithium carbonate is preferably at least 15% by weight, more preferably at least 25% by weight lithium carbonate. Carbon dioxide can be recycled to carbonation reactor 38 via line 42.

Lithium carbonate solution 90 is supplied to separation vessel 92 wherein solid lithium carbonate is produced via line 94. A solution that includes sodium chloride and possibly a small amount of lithium carbonate is produced as stream 96.

Sodium carbonate solution 90, which includes solid lithium carbonate and aqueous sodium chloride, is supplied to separator means 92, which can include various means for the separation of solids from liquids including, for example, centrifuge, settling tank, filters, screens, and the like. Separator means 92 can also include water inlets and outlets (not shown) for the washing of the separated solid lithium carbonate. Separator means 72 can also include means for drying and/or the removal of water from the solid lithium carbonate, including for example, centrifuge, heaters, blowers, presses, and the like. A solid sodium carbonate product is collected via line 94. Optionally, a portion of sodium chloride stream 96 can be recycled via line 98 to electrochemical cell 32. Optionally, the sodium chloride solution can be recycled to the washing step of the lithium extraction media. In certain embodiments, the sodium chloride required for the process can be generated by the selective crystallization of sodium chloride from the geothermal, Smackover, or other brine.

In certain embodiments, the process may include means for the neutralization of any lithium carbonate that is included in the sodium chloride solution, such as by neutralizing the solution by adding an effective amount of hydrochloric acid or like acid. In embodiments wherein the lithium carbonate can be effectively removed, the solution can be recycled to the electrochemical cell, however, any lithium carbonate included therein may cause problems with the performance of the electrochemical cell.

Zinc and Manganese Recovery

Figure 9:
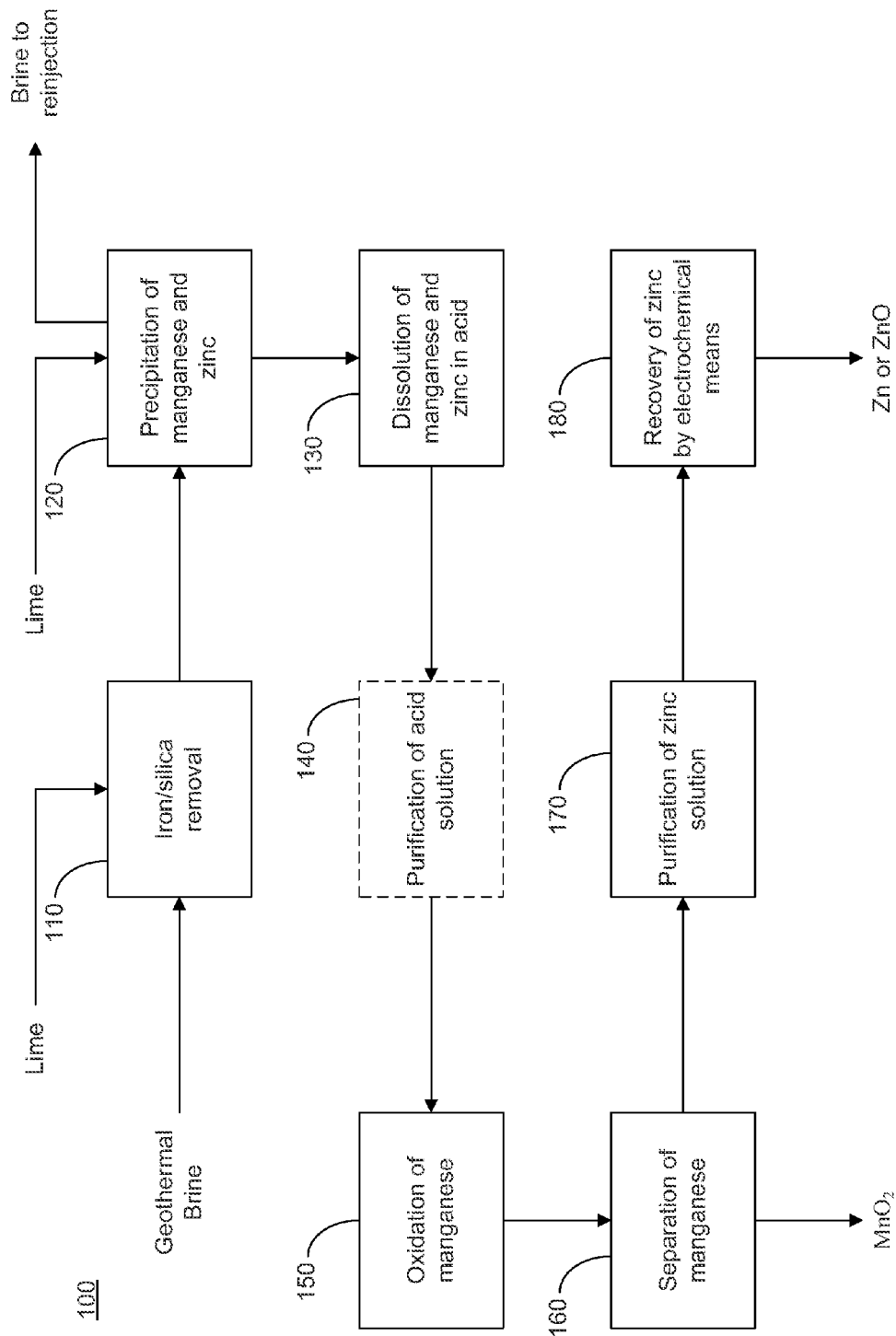
FIG. 9 illustrates a process for the recovery of manganese and zinc from a geothermal brine according to one embodiment of the invention.

In certain embodiments, following the removal and/or recovery of lithium from a brine or like solution, manganese and zinc can be recovered for subsequent use. Referring to FIG. 9, a process 100 is provided for the recovery of zinc and/or manganese. It is understood that in certain embodiments the processes described herein for the recovery of zinc and manganese can be performed such that only one element, either zinc or manganese, is recovered. If present, silica can be removed in iron/silica removal step 110, where lime and a brine or other manganese and/or zinc containing solution are contacted, as described previously. After iron/silica removal step 110, in precipitation step 120, a base (e.g., calcium oxide, calcium hydroxide or the like) is added to the brine to adjust or maintain a pH of the brine at greater than at least about 6, preferably between about 6 and 8.5, more preferably between about 6.5 and 8. In alternate embodiments, the pH is maintained at about 7. In certain embodiments, the pH is maintained at less than about 9. The base may be in solution or slurry form. Furthermore, the solution can be exposed to an oxygen source and manganese and zinc precipitates are formed. In certain embodiments, depending upon the pH of the solution, a lead precipitate may also be formed. To achieve oxidation of the manganese, air is preferably supplied to the solution by sparging or bubbling. Other oxidants suitable for the oxidation of the manganese can include hypohalites, hydrogen peroxide, and ozone.

The solids in the brine and base, which solids can include at least manganese and zinc, are separated from the remainder of the mixture, which retains the majority of ions present in the brine. Separation of the solids can be done by conventional filtration means and can optionally include centrifugation or other known techniques for concentration of the solids. In certain embodiments, the remaining brine solution from which the manganese and zinc have been removed can then be reinjected into the geothermal well from which the brine was originally removed.

The manganese and zinc solids that are separated from the remaining brine solution can then be dissolved in an acid solution in step 130. Preferred acids include strong mineral acids, such as hydrochloric acid, sulfuric acid, methanesulfonic acid, and the like. In certain embodiments, lead and/or calcium precipitates may be formed during the precipitation of the manganese and zinc. In these embodiments, the selected acid is preferably sulfuric acid, as sulfuric acid is selective for manganese and zinc precipitates, and does not dissolve the lead and/or calcium precipitates that may be present. The acid is preferably added to the solids in greater than approximately a 1:1 molar ratio to the solids. In certain embodiments, it may be beneficial to minimize the amount of excess acid that is utilized for dissolving the manganese and zinc precipitates, for ease of performance of downstream processes, as well as for economic and environmental considerations. In certain embodiments, the solids and acid are mixed to ensure complete dissolution of the solids.

The acid and dissolved metal solution is then filtered to remove remaining solids, if any, and the solution may then be purified in optional purification step 140 to remove trace metals, which may be present in the acidified solution. It is believed that metals, such as copper, cadmium, nickel, antimony and/or cobalt, as well as other metals or ions, may be present in trace amounts in the acid and dissolved metal solution. These trace metals may interfere with the subsequent separation of manganese and zinc. Purification of the acid and dissolved metal solution can be achieved by known means, such as ion exchange or by treatment with zinc dust. Zinc dust operates by first displacing other more noble metals from solution and allowing them to precipitate on undissolved zinc dust. For example, copper ions present in the solution will precipitate as copper metal or will deposit on undissolved zinc dust.

Manganese and zinc can be extracted from the acid and dissolved metal solution using solvent extraction techniques. Suitable solvents for the extraction of manganese and zinc include phosphines, phosphoric acids, and phosphinic acids, such as the following: di(2-ethylhexyl)phosphoric acid (DEHPA) in kerosene or Cyanex® 272 (bis(2,4,4-trimethylpentyl)phosphinic acid); Ionquest 290 (available form Rhodia Inc.) in aliphatic kerosene or the highly branched carboxylic acid extractant (versatic 10)(10-decyl-4-pyridinecarboxylate). In certain embodiments, DEHPA is a suitable extraction solvent, particularly in embodiments where iron has been previously removed.

Other exemplary solvents that may be used for the extraction of zinc are discussed in U.S. Pat. No. 5,135,652, the disclosure of which is herein incorporated by reference in its entirety. These exemplary solvents include mono-2-ethylhexylphosphoric acid (M2EHPA), di-2-ethylhexylphosphoric acid (D2EHPA), and mixtures thereof (EHPA). Other exemplary solvents include bis-2,4,4-trimethylpentylmonothiophosphinic acid (Cyanex® 302) and bis-2,4,4-trimethylpentyldithiophosphinic acid (Cyanex® 301). In certain embodiments, the extractant includes both phosphoric acid and phosphinic acid. In certain embodiments, the ratio of phosphoric acid to phosphinic acid is greater than about 1:1, preferably between about 1:1 and 1:6. In certain embodiments, the extractant can be diluted with a hydrocarbon solvent, preferably a dearomatized aliphatic hydrocarbon. Exemplary diluents include Exxsol™ D80.

The pH during the extraction is maintained at less than about 7, preferably between about 1 and 5, more preferably in the range of about 1.5 to 3.5.

Other solvents suitable for the extraction of zinc from brine solutions are described in "Recovery of Zinc(II) from Acidic Sulfate Solutions. Simulation of Counter-Current Extraction Stripping Process," Gotfryd, L. and Szymanowski, J.; Physicochemical Problems of Mineral Processing, vol. 38 (2004), pp. 113-120; "New Developments in the Boleo Copper-Cobalt-Zinc-Manganese Project," Dreisinger, et al.; available at http://bajamining.com/_resources/Reports/alta_paper_2006_boleo_final.pdf; "Zinc Solvent Extraction in the Process Industries," Cole, P. and Sole, K.; Mineral Processing and Extractive Metallurgy Review, vol. 24, no. 2 (2003), pp. 91-137; "Solvent extraction of zinc(II) and manganese(II) with 5,10,15,20-tetraphenyl-21H,23H-porphine (TPP) through the metal exchange reaction of lead(II)-TPP," Kawai, T., Fujiyoshi, R., and Sawamura, S.; Solvent Extr. Res. Dev. Japan, vol. 7 (2000), pp. 36-43, "Solvent Extraction of Zinc from Strong Hydrochloric Acid Solution with Alamine336," Lee, M. and Nam, S.; Bull. Korean Chem. Soc., vol. 30, no. 7 (2009), pp. 1526-1530, the disclosures of which are incorporated herein by reference.

Manganese can be isolated by electrolysis or, in step 150, by oxidation to produce manganese dioxide, or by precipitation as a carbonate by reaction with sodium carbonate. In certain preferred embodiments, manganese can be selectively isolated from zinc as manganese dioxide by electrolysis in a sulfate solution, at a metal anode, such as titanium or carbon. Alternatively, selective oxidation of manganese to manganese dioxide can be achieved with an oxidant, such as chlorine, hydrogen peroxide, or the like to provide solid manganese dioxide and zinc containing solution. In step 160, precipitated manganese dioxide can be separated from the zinc containing solution by known means, such as filtration, centrifugation, or a like process.

In an alternate embodiment, manganese dioxide can be generated at the anode of a divided electrochemical cell by oxidation of manganese (II) and manganese (III) to generate a manganese dioxide, deposited on the surface of the electrode. After the solution is passed through the anode compartment, it is then fed to the cathode compartment where zinc metal is electrodeposited. The current density can range from between about 50 to about 500 A/m². The separator, such as an ion exchange membrane or porous material that allows the passage of liquids, positioned between the anode and cathode assists in preventing deposition of manganese dioxide on the zinc metal. In certain embodiments, the separator can include a series of baffles. In certain embodiments, it may be advantageous to remove solid manganese dioxide from the electrolytic stream formed in the anode compartment lost from the surface of the anode, such as by filtration, prior to supplying to the cathode compartment. Production of manganese dioxide by electrochemical means and recovery of zinc metal by electrowinning can include a conductive solution, such as sulfate, chloride, methanesulfonate, or the like, for improved efficiency. In certain embodiments, the electrochemical cell can include a small amount of free acid in the solution. In alternate embodiments, the electrochemical cell can be operated at a pH ranging from about 0 to 2. Following recovery of the manganese and zinc, the respective solutions can be recycled to the solvent extraction step. Alternatively, the respective solutions can be recycled to the acid solution.

The zinc containing solution can then be optionally purified in step 170 and then supplied to an electrochemical cell for electrochemical recovery in step 180 by electrowinning (also known as electroextraction). Electrowinning utilizes an electrochemical cell wherein a current is passed from an inert anode, such as lead dioxide, iridium dioxide coated titanium, or other stable substrate, through the zinc containing solution, leading to deposition of the zinc on the cathode. The base cathode can be aluminum, although other metals, such as steel, stainless steel, and titanium, can also be used.

The cathode material is selected based upon chemical stability, electrical conductivity, and the ease of removal of zinc from substrate.

Alternatively, in the process illustrated by FIG. 9, the steps for the isolation and recovery of manganese and zinc can be reversed, i.e., the zinc can be separated and isolated from a solution that includes zinc and manganese by electrowinning, followed by the isolation of manganese by either electrowinning or oxidation of the manganese to produce manganese dioxide.

Optionally, the process can include a lithium recovery step from the brine. Recovery methods are known in the art, such as described in U.S. Pat. Nos. 4,116,856; 4,116,858; 4,159,311; 4,221,767; 4,291,001; 4,347,327; 4,348,295; 4,348,296; 4,348,297; 4,376,100; 4,430,311; 4,461,714; 4,472,362; 4,540,509; 4,727,167; 5,389,349; 5,599,516; 6,017,500; 6,280,693; and 6,555,078, each of which is incorporated herein by reference in their entirety. Alternatively, methods can be employed utilizing a lithium aluminate intercalate/gibbsite composite material, a resin based lithium aluminate intercalate, and/or a granulated lithium aluminate intercalate. The gibbsite composite is a lithium aluminate intercalate that is grown onto an aluminum trihidrate core. The resin-based lithium aluminate intercalate is formed within the pores of a macroreticular ion exchange resin. The granulated lithium aluminate intercalate consists of fine-grained lithium aluminate intercalate produced by the incorporation of a small amount of inorganic polymer. The process of contacting the lithium aluminate intercalate material with the geothermal brine is typically carried out in a column that includes the extraction material. Geothermal brine is flowed into the column and lithium ions are captured on the extraction material, while the water and other ions pass through the column. After the column is saturated, the captured lithium is removed by flowing water having a small amount of lithium chloride present through the column. In preferred embodiments, multiple columns are employed for the capture of the lithium.

Figure 10:
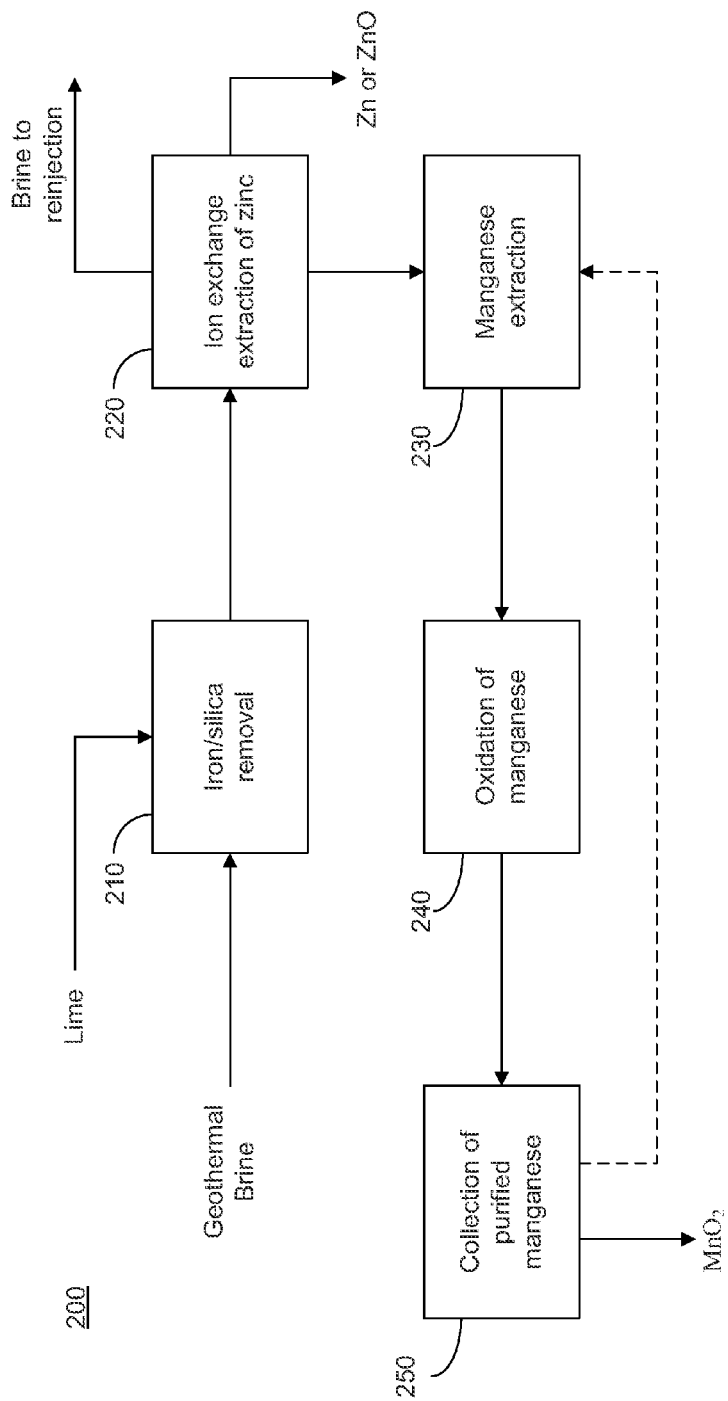
FIG. 10 illustrates another process for the recovery of manganese and zinc from a geothermal brine according to another embodiment of the invention.

In another embodiment of the present invention, in process 200 provided in FIG. 10, iron and silica are first removed from the geothermal brine in step 210. Methods for the removal of silica and iron include those methods previously described with respect to FIG. 9, and preferably include oxidation of the iron from iron (II) to iron (III), and the control of the pH of the solution with the addition of a base. Preferably, the iron is oxidized with air, and the pH is controlled by the addition of a base, such as calcium oxide or calcium hydroxide, or like compound.

The brine solution, having a reduced concentration of silica and iron relative to the initial brine feed, can be supplied to zinc removal process 220 that can include an ion exchange process, for example a basic anionic ion exchange resin like the chloride of a quaternary amine divinylbenzene/stryrene copolymer, or the chloride of trimethylamine functionalized chloromethylated copolymer of styrene and divinylbenzene, such as is described in U.S. Pat. No. 6,458,184, incorporated herein by reference in its entirety. Zinc separated by ion exchange, existing as zinc chloride or a zinc chloride anions, can then be converted into a saleable zinc product, such as zinc metal or zinc oxide. In certain embodiments, remaining brine solution from which the manganese and zinc was removed can then be reinjected into the geothermal well from which the brine was originally removed.

The remaining solution, which includes manganese, can then optionally be supplied to purification step 230 and purified by ion exchange, solvent extraction, or like process, and the manganese containing phase can be provided to oxidation step 240, such as an electrochemical cell or chemical oxidation process, as described with respect to FIG. 1, to facilitate the recovery of manganese dioxide. Purified manganese can be collected in step 250 by filtration. As shown with the dashed line, the liquid phase from step 250 can optionally be recycled to manganese extraction step 230. As previously discussed, following recovery of the manganese and zinc, the respective solutions can be recycled to the solvent extraction step. Alternatively, the respective solutions can be recycled to the acid solution.

As noted with respect to FIG. 9, in process 200 described in FIG. 10, the lithium can optionally be removed from the brine solution at any point during the process by the means discussed above.

Figure 11:
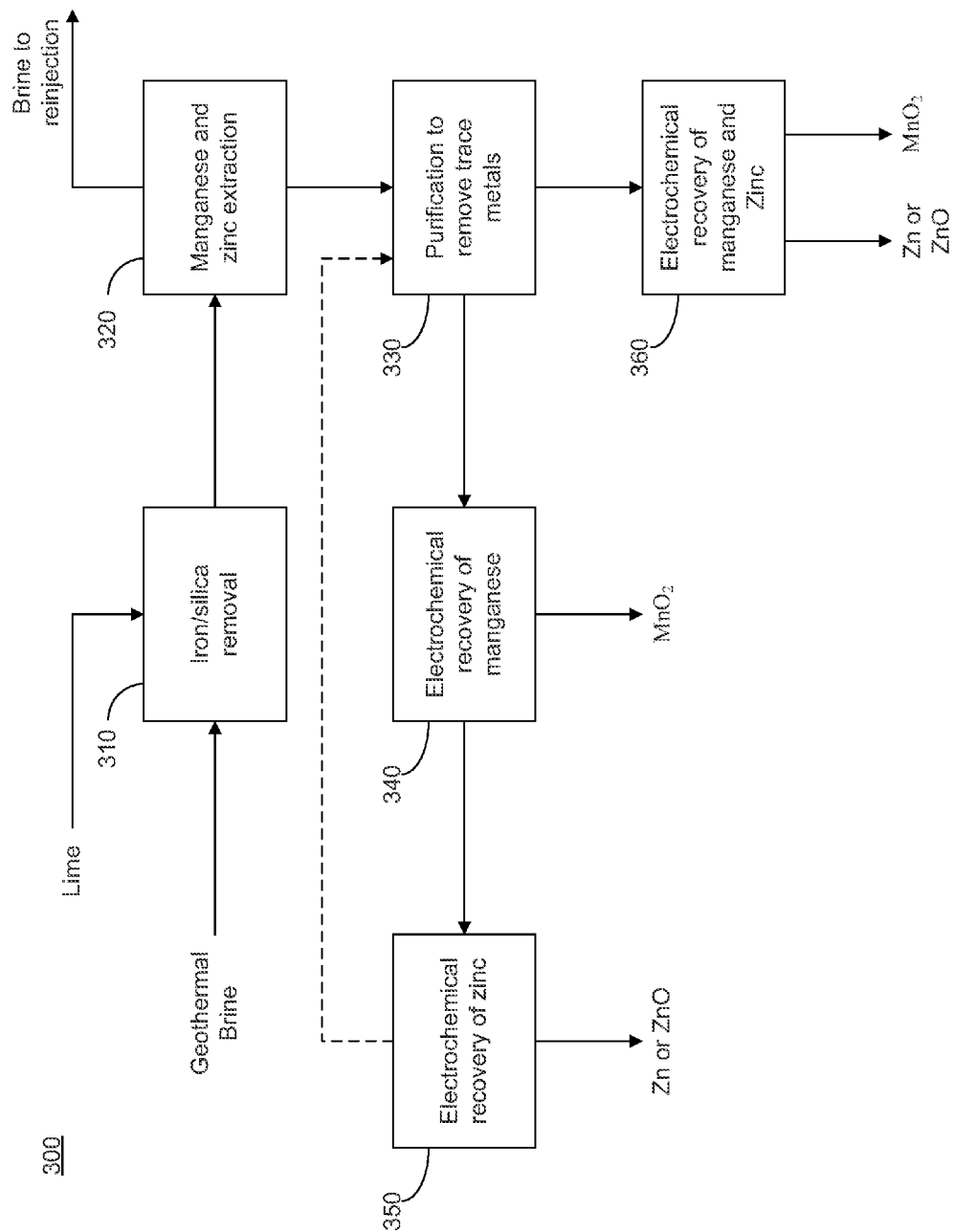
FIG. 11 illustrates another process for the recovery of manganese and zinc from a geothermal brine according to another embodiment of the invention.

In yet another embodiment, in process 300 shown in FIG. 11, a method for the separation and isolation of manganese and zinc from a brine is provided. As noted with respect to FIGS. 9 and 10, the first step of the process includes the removal of iron and silica from the brine solution in step 310. Preferably, as discussed above, the iron is oxidized and base is added to the solution to control the pH. Preferably, iron is oxidized with air, and the base is calcium oxide, calcium hydroxide, or a like compound.

Following removal of a major portion of the silica and iron, the manganese and zinc can be removed by liquid-liquid extraction step 320. Exemplary liquids suitable for the extraction of manganese and zinc are described in U.S. Pat. No. 6,458,184 and U.S. Pub. Pat. App. No. 20030226761, the disclosures of which are incorporated herein by reference in their entirety. The solvents can include, for example, water-immiscible cationic organic solvents, such as di-(2-ethylhexyl) phosphoric acid (D2EHPA), and other similar solvents, as known in the art. In certain embodiments, the remaining brine solution from extraction step 320, from which the manganese and zinc have been removed, can then be reinjected into the geothermal well from which the brine was originally removed.

Following the liquid-liquid extraction step, the extraction solution that includes the manganese and zinc can be provided to one or more purification steps 330. Purification steps 330 preferably operable to remove calcium and other divalent cations, as well as some metals, such as copper, cadmium, cobalt, molybdenum, and nickel, although the purification steps are not limited to these metals.

Following purification step 330, manganese and zinc are isolated in steps 340 and 350, respectively. Specifically, manganese dioxide and zinc can each separately be produced from solution by electrowinning. In one embodiment, zinc is recovered first, followed by manganese. In an alternate embodiment, manganese is recovered first, followed by zinc. In certain embodiments, the pH is maintained at less than about 3.5 during the electrowinning process. In alternate embodiments, the temperature is maintained at less than about 60° C. during the electrowinning process. In certain embodiments, the pH of the solution supplied to manganese electrochemical recovery step 340 is about 5, and the pH of the solution exiting the electrochemical cell is about 1. The pH of the solution supplied to zinc electrochemical recovery step 350 is about 1.

In alternate embodiments, solution from purification step 330 can be supplied to a single electrochemical recovery step 360 wherein zinc and manganese can be deposited simultaneously as zinc oxide and manganese dioxide.

As previously discussed, following recovery of the manganese and zinc, the respective solutions can be recycled to either the solvent extraction step or to the acid solution. In certain embodiments, as shown by the dashed line, the solution from zinc electrochemical recovery step 350 can be recycled to purification step 330.

Figure 12:
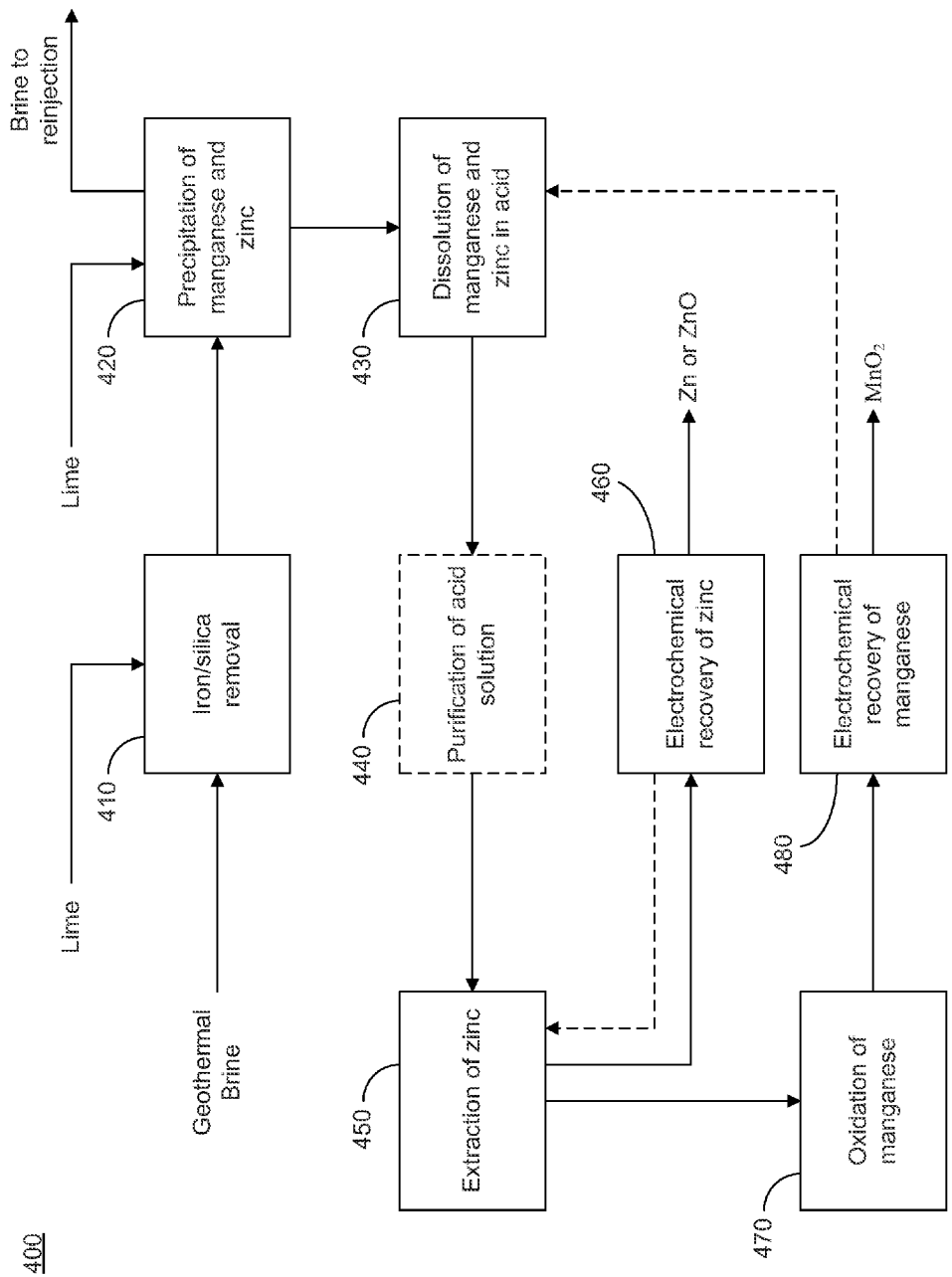
FIG. 12 illustrates another process for the recovery of manganese and zinc from a geothermal brine according to another embodiment of the invention.

In another embodiment, as provided in FIG. 12, process 400 for the recovery of manganese or zinc from a geothermal brine is provided. As discussed with respect to FIG. 9, step 410 of process 400 includes removal of iron and silica from the brine solution. In certain embodiments, iron is oxidized and base is added to control the pH of the solution. In certain embodiments, iron is oxidized with air and the base is calcium oxide or calcium hydroxide, or like compound.

Following removal of the iron and silica, in precipitation step 420, additional base, such as lime, slaked lime, limestone, sodium hydroxide, and the like, is added to achieve a pH of between about 6 and 9, preferably up to about 8 when sparged with air, or up to about 9 when it is not sparged with air, to facilitate precipitation of manganese and zinc. Manganese and zinc precipitates are collected by known means and dissolved in acid solution in step 430, as previously discussed herein. In certain embodiments, remaining brine solution from extraction step 420, from which the manganese and zinc have been removed, can then be reinjected into the geothermal well from which the brine was originally removed.

Optionally, acid solution, which includes the manganese and zinc, can be purified in step 440, to remove trace metal impurities, such as heavy metals, i.e., cobalt, copper, cadmium, nickel, and the like. The acid solution is extracted in step 450 to recover zinc, as previously provided. Following extraction, first solution that includes zinc and the extraction solvent, and second solution, which includes manganese, are produced.

Zinc can then be recovered by electrochemical means in step 460, such as by electrowinning or a like process. Manganese can be recovered by first oxidizing the manganese in step 470 to produce manganese dioxide, which can then be recovered electrochemically in step 480 by known means. As discussed, as shown by the dashed lines, following recovery of manganese and zinc, solutions from steps 460 and 480 can be recycled to solvent extraction step 450 or to the acid solution of dissolution step 430, respectively.

Figure 13:
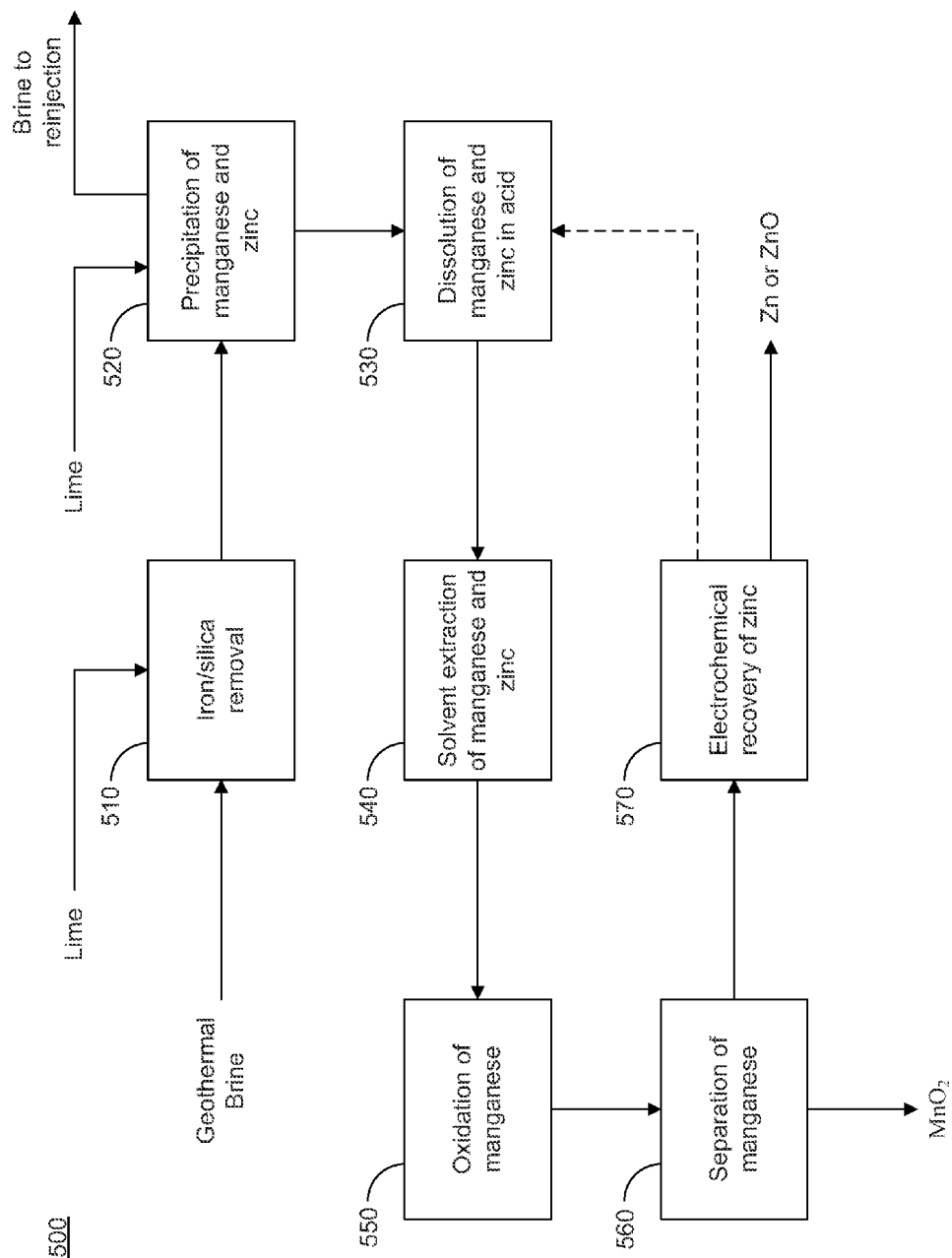
FIG. 13 illustrates another process for the recovery of manganese and zinc from a geothermal brine according to another embodiment of the invention.

In another embodiment, as provided in FIG. 13, process 500 for the recovery of manganese or zinc from a geothermal brine is provided. A first step 510 of the process includes the removal of iron and silica from the brine solution. In certain embodiments, iron is oxidized and base is added to control the pH of the solution. In certain embodiments, iron is oxidized with air and the base is calcium oxide or calcium hydroxide.

Following removal of iron and silica, in precipitation step 520, additional base to adjust the pH to at least about 6 is added to facilitate the precipitation of manganese and zinc. Manganese and zinc precipitates are collected by known means, such as by filtration, centrifugation, or a like process, and dissolved in an acid solution in step 530, as previously discussed herein. Optionally, the acid solution, which includes manganese and zinc, can be purified. In certain embodiments, brine solution remaining from extraction step 520, from which manganese and zinc have been removed, can be reinjected into the geothermal well from which the brine was originally removed.

Acid solution from step 530 can be extracted in extraction step 540 to recover manganese and zinc, as previously provided, to provide an extract solution that includes both manganese and zinc. Manganese in the extract solution can be oxidized in step 550 to produce manganese dioxide, which can be separated by filtration or other known means in step 560. Zinc remaining in the extract solution can be recovered in step 570 by electrochemical means, such as electrowinning or a like process. In certain embodiments, as shown by the dashed line, the solution from zinc electrochemical recovery step 570 can be recycled to the dissolution step 530.

Figure 14:
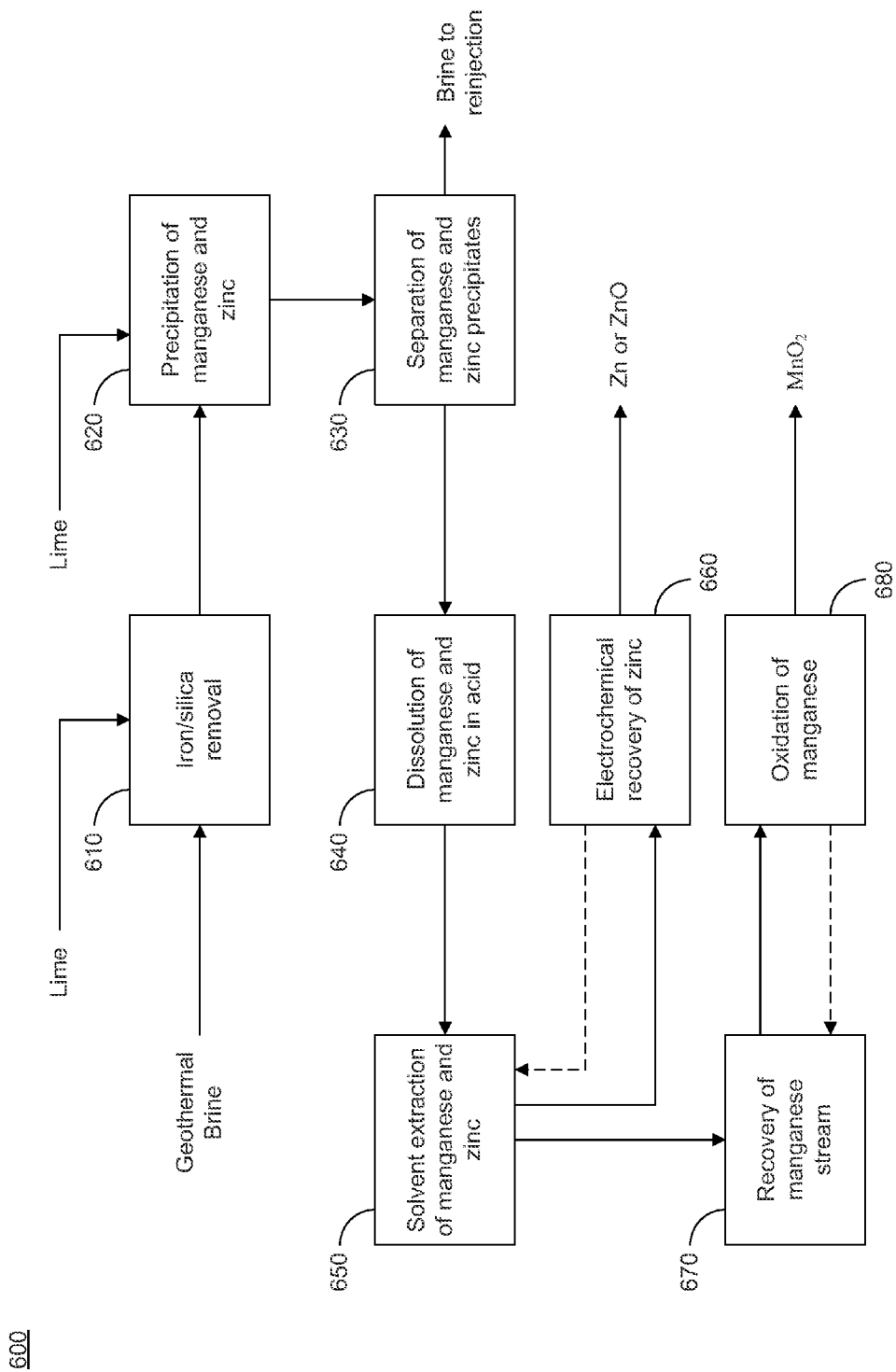
FIG. 14 illustrates another process for the recovery of manganese and zinc from a geothermal brine according to another embodiment of the invention.

In another embodiment provided in FIG. 14, process 600 for recovery of manganese or zinc from a geothermal brine is provided. First step 610 includes removal of iron and silica from a brine solution. In certain embodiments, iron is oxidized and base is added to control the solution pH, preferably to at least about 5 and up to about 6. In certain embodiments, iron is oxidized with air and the base is calcium oxide or calcium hydroxide.

Following removal of the iron and silica, in precipitation step 620, additional base is added to achieve a pH of at least about 6 to cause precipitation of manganese and zinc. Manganese and zinc precipitates are collected by known means in step 630 and dissolved in acid solution in step 640, as previously discussed. Optionally, acid solution, which includes manganese and zinc, can be purified. In certain embodiments, the remaining brine solution from extraction step 630, from which manganese and zinc have been removed, can be reinjected into the geothermal well from which the brine was originally removed.

Acid solution from step 640 is then subjected to double extraction step 650, wherein the acid solution is contacted with two separate extraction solvents to recover two separate streams, wherein recovery step 670 recovers a first stream that includes manganese and a second stream is recovered includes zinc. Appropriate extraction solvents for extraction of manganese and zinc have been previously discussed. Manganese in the first stream can be oxidized in oxidation step 680 to produce manganese dioxide, which can be separated by filtration or other known means. Zinc in the second stream can be recovered by electrochemical means in step 660, such as electrowinning. As discussed and shown by dashed lines, following recovery of zinc and manganese in steps 660 and 680, the respective solutions can be recycled to solvent extraction step 650 or to manganese stream recovery step 670, respectively.

Figure 15:
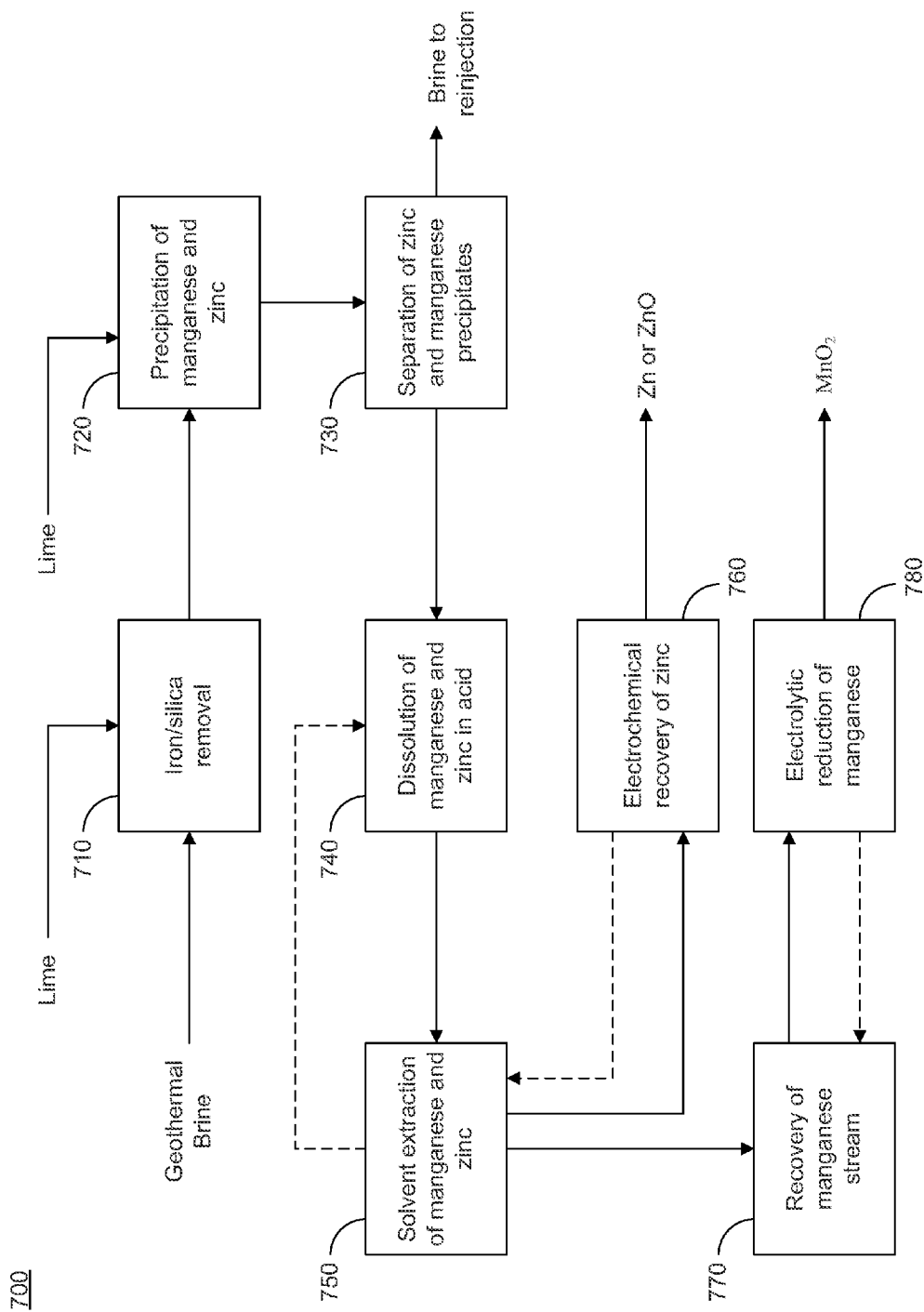
FIG. 15 illustrates another process for the recovery of manganese and zinc from a geothermal brine according to another embodiment of the invention.

In another embodiment and provided in FIG. 15, process 700 for recovery of manganese or zinc from a geothermal brine is provided. As discussed, first step 710 includes removal of iron and silica from brine solution. In certain embodiments, iron is oxidized and base is added to control the pH of the solution to about 5 and 6. In certain embodiments, iron is oxidized with air and the base is calcium oxide or calcium hydroxide.

Following removal of the iron and silica, in precipitation step 720, additional base is added to achieve a pH of between about 6 and 9, preferably up to about 8 when sparged with air, or up to about 9 when it is not sparged with air, to facilitate the precipitation of manganese and zinc. Manganese and zinc precipitates are separated from a liquid phase in step 730, collected by known means, such as filtration, centrifugation or a like process, and dissolved in an acid solution in step 740, as previously discussed herein. Optionally, acid solution, which includes manganese and zinc, can be purified. In other embodiments, brine solution remaining from extraction step 730 that manganese and zinc have been removed, can be reinjected into the geothermal well from which the brine was originally removed.

Acid solution from step 740 is then subjected to double extraction step 750, wherein the acid solution is contacted with two separate extraction solvents to recover two separate streams, wherein the first stream recovered in step 770 includes manganese, and wherein the second stream includes zinc. Appropriate extraction solvents for the extraction of manganese and zinc have been previously discussed. Manganese in the first stream can be electrolytically reduced in step 780, as known in the art, to produce manganese metal. Zinc in the second stream can be recovered by electrochemical means in step 760, such as by electrowinning or like process. As previously discussed and shown by dashed line, following recovery of zinc and manganese in steps 760 and 780, the respective solutions can be recycled to solvent extraction step 750 or to manganese stream recovery step 770, respectively. In other embodiments and shown by the dashed line, a portion of the non-extraction solvent solution from extraction step 750 can be recycled to dissolution step 740.

Figure 16:
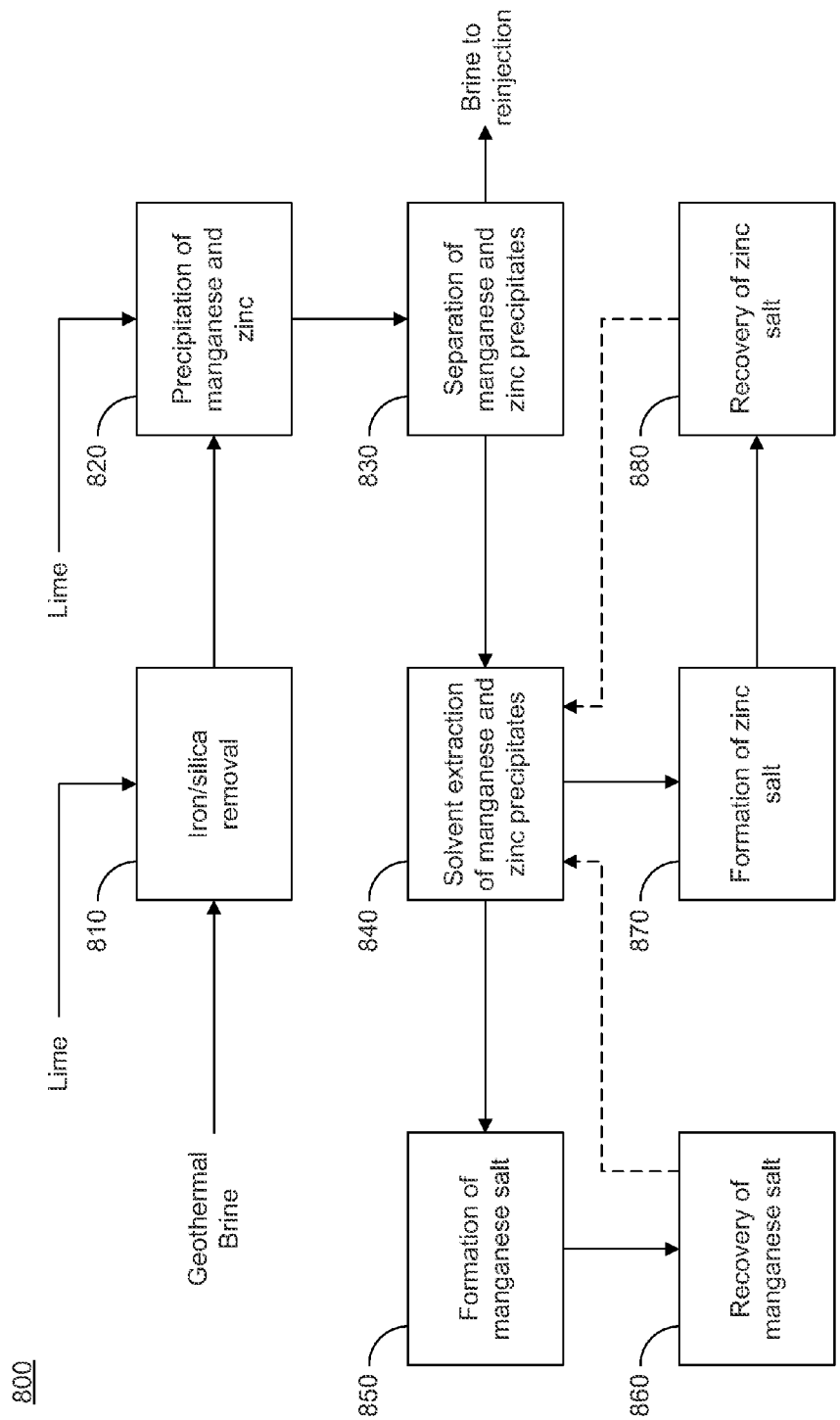
FIG. 16 illustrates another process for the recovery of manganese and zinc from a geothermal brine according to another embodiment of the invention.

In another embodiment, as provided in FIG. 16, process 800 for recovery of manganese or zinc from a geothermal brine is provided. As previously discussed, a first step 810 of the process includes the removal of iron and silica from the brine solution. In certain embodiments, iron is oxidized and base is added to control the pH of the solution to between about 4.5 and 6, preferably between about 4.75 and 5.5. In certain embodiments, iron is oxidized with air and the base is calcium oxide or calcium hydroxide.

Following removal of the iron and silica, in precipitation step 820, additional base is added to achieve a pH of between about 6 and 9, preferably up to about 8 when sparged with air, or up to about 9 when it is not sparged with air, to facilitate the precipitation of manganese and zinc. Manganese and zinc precipitates are separated and collected by known means in step 830, such as by filtration, centrifugation or a like process, and dissolved in an acid solution, as previously discussed herein. Optionally, the acid solution that includes manganese and zinc can be purified. In certain embodiments, brine solution remaining from extraction step 830, from which manganese and zinc have been removed, can then be reinjected into the geothermal well from which the brine was originally removed.

The acid solution is then subjected to a double extraction in step 840, wherein the acid solution is contacted with two separate extraction solvents to recover two separate streams, wherein the first stream includes manganese and the second stream includes zinc. Appropriate extraction solvents for the extraction of manganese and zinc have been previously discussed. Manganese in the first stream can be reacted in step 850 with an acid, such as sulfuric acid, hydrochloric acid, hydrobromic acid, or a like acid to produce a manganese salt, which can then be recovered by precipitation in step 860. Zinc in the second stream can be recovered by electrochemical means, such as electrowinning or like means, or may also be reacted in step 870 with an acid, such as sulfuric acid, hydrochloric acid, hydrobromic acid, or a like acid to produce a salt solution and recovered in step 880 by precipitation, evaporative crystallization, spray drying, or a like process. As previously discussed, as shown by the dashed line, following recovery of manganese and zinc salts in steps 860 and 880, the respective solutions can be recycled to solvent extraction step 840.

Figure 17:
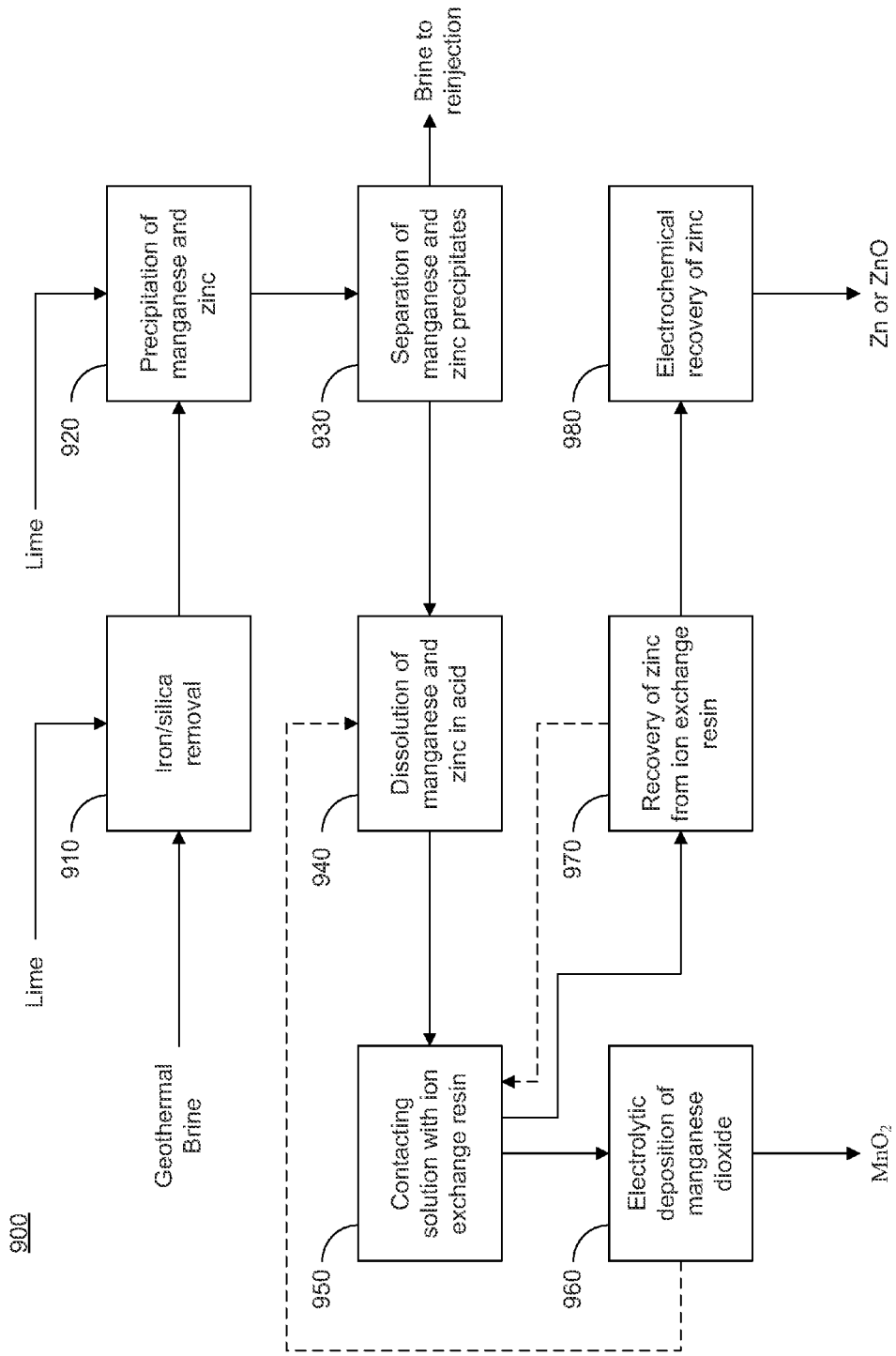
FIG. 17 illustrates another process for the recovery of manganese and zinc from a geothermal brine according to another embodiment of the invention.

In another embodiment, as shown in FIG. 17, process 900 for recovery of manganese or zinc from a geothermal brine is provided. As previously discussed, first step 910 of the process includes the removal of iron and silica from the brine solution. In certain embodiments, iron is oxidized and base is added to control the pH of the solution to between about 4.5 and 6, preferably between about 4.75 and 5.5. In certain embodiments, iron is oxidized with air and the base is calcium oxide or calcium hydroxide.

Following the removal of iron and silica, in precipitation step 920 additional base is added to achieve a pH of between about 6 and 9, preferably up to about 8 when sparged with air, or up to about 9 when it is not sparged with air, to facilitate the precipitation of manganese and zinc. Manganese and zinc precipitates are separated in step 930, collected by known means and dissolved in an acid solution in step 940, as previously discussed herein. Optionally, the acid solution, which includes manganese and zinc, can be purified, as previously discussed. In certain embodiments, the remaining brine solution from extraction step 930, from which the manganese and zinc have been removed, can then be reinjected into the geothermal well from which the brine was originally removed.

The acid solution is contacted with an ion exchange resin in step 950, preferably a basic anionic exchange resin, to remove zinc from the solution. In step 960, manganese can be recovered from the solution by electrolytically depositing manganese dioxide from the substantially silica free brine, such as by electrowinning or a like process. In step 970, zinc can then be recovered from the ion exchange resin by known means, and can be converted electrochemically in step 980 to zinc, and the zinc can then be converted to zinc oxide by known means. Optionally, as shown by the dashed line, following removal of the manganese in step 960, the remaining solution can be recycled to dissolution step 940. Similarly, as shown by the dashed line, following zinc recovery step 970, the remaining brine solution can be recycled to ion exchange resin contacting step 950.

In other embodiments, an aqueous chloride solution is employed to wash zinc from the ion exchange resin, preferably having a chloride concentration of between about 0.5 and 5%. Optionally, multiple ion exchange resins can be employed. Optionally, a portion of a zinc solution produced by washing the ion exchange resin can be recycled to a prior stage of the process. In other embodiments, zinc solution produced by washing the ion exchange resin can be extracted with solvent, wherein the solvent advantageously extracts zinc from solution. Exemplary extraction solvents have been discussed, and can include D2EHPA or the like. Following removal of zinc from the ion exchange resin, a zinc-rich solution is obtained and zinc can then be recovered electrochemically from the zinc-rich solution.

Figure 18:
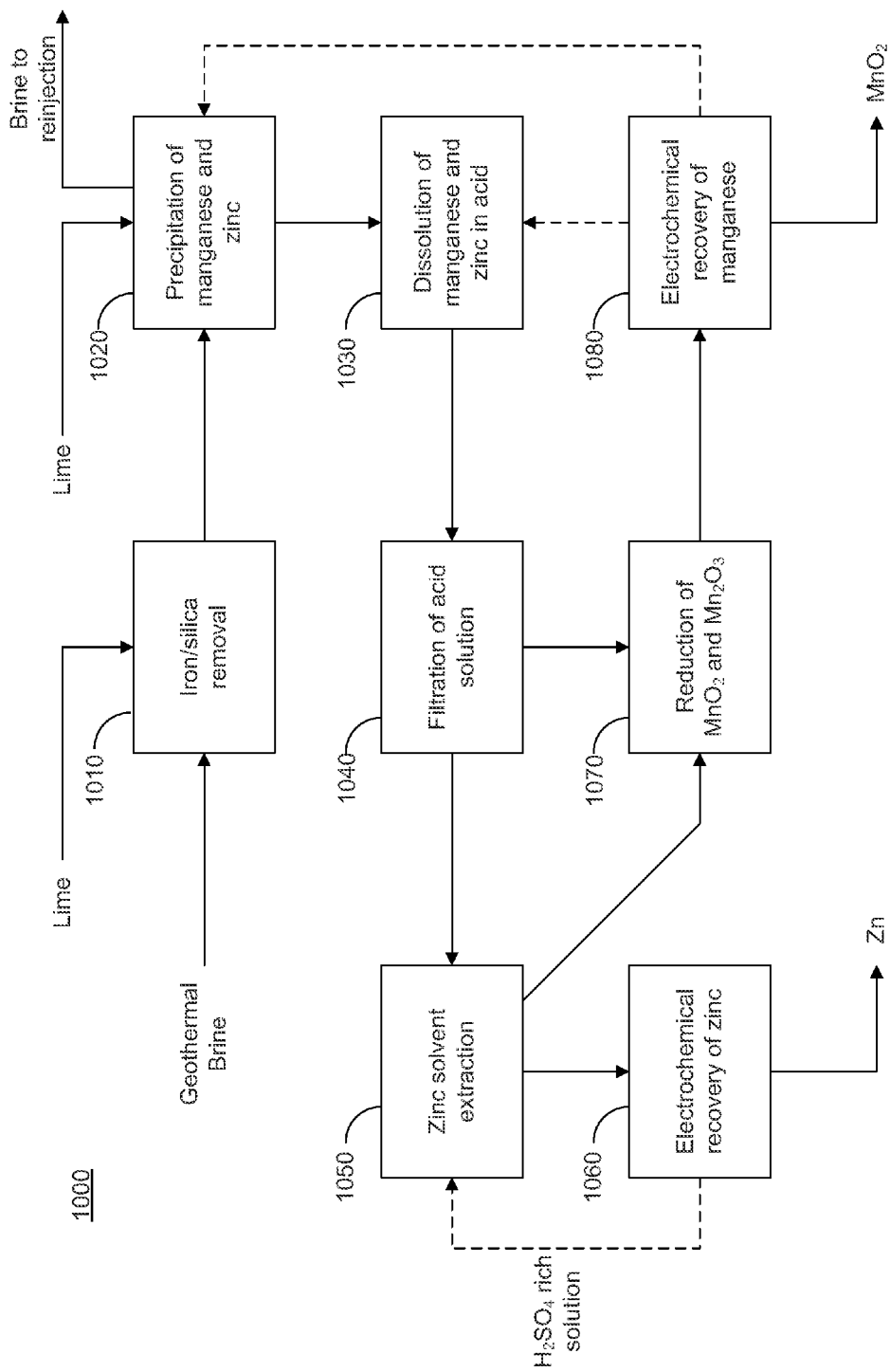
FIG. 18 illustrates another process for the recovery of manganese and zinc from a geothermal brine according to another embodiment of the invention.

Referring now to FIG. 18, in another aspect, another process 1000 for recovery of manganese and/or zinc from a geothermal brine is provided. First step 1010 of the process includes the removal of iron and silica from the brine solution, as previously described herein. In certain embodiments, iron is oxidized and base is added to control the pH of the solution to between about 4.5 and 6, preferably between about 4.75 and 5.5. In certain embodiments, iron is oxidized with air and the base is calcium oxide or calcium hydroxide.

Following removal of the iron and silica, in precipitation step 1020, additional base is added to cause the precipitation of manganese and zinc. Manganese and zinc precipitates are collected by known means and, in step 1030, dissolved in an acid solution, as previously discussed herein. Optionally, the acid solution that includes manganese and zinc can be purified. In certain embodiments, remaining brine solution from precipitation step 1020, from which the manganese and zinc have been removed, can then be reinjected into the geothermal well from which the brine was originally removed.

Acid solution is filtered in step 1040 to produce a manganese containing solution and zinc precipitates. The solution is passed to zinc solvent extraction step 1050 to recovery remaining zinc. Zinc precipitates are electrochemically converted to zinc metal in step 1060. The manganese containing solution from the filtration step is provided to reduction step 1070 wherein the manganese containing solution is contacted with a reducing agent, such as sulfur dioxide. In step 1080, reduced manganese can be recovered from the solution by electrolytically depositing manganese dioxide, such as by electrowinning.

Optionally, as shown by dashed line, following recovery of zinc in electrochemical recovery step 1060, a sulfuric acid-rich solution can be recycled to zinc extraction step 1050. Similarly, as shown by the dashed line, following the electrochemical recovery of manganese in step 1080, the remaining brine solution can be recycled to either precipitation step 1020 or dissolution step 1030.

Figure 19:
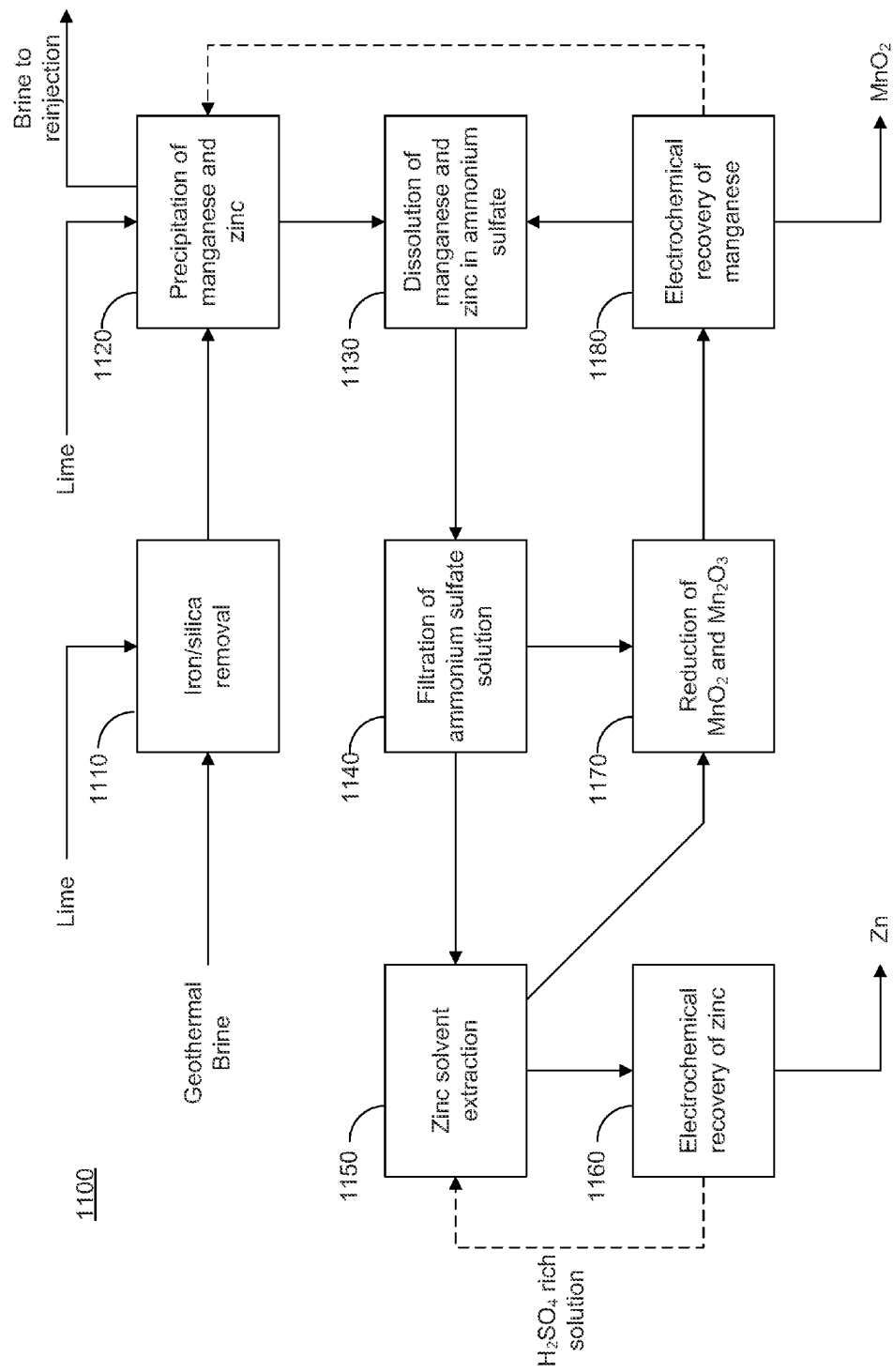
FIG. 19 illustrates another process for the recovery of manganese and zinc from a geothermal brine according to another embodiment of the invention.

Referring now to FIG. 19, in another aspect, another process 1100 for recovery of manganese and/or zinc from geothermal brine is provided. First step 1110 of the process includes removal of iron and silica from the brine solution, as previously described herein. In certain embodiments, iron is oxidized and base is added to control the pH of the solution to between about 4.5 and 6, preferably between about 4.75 and 5.5. In certain embodiments, iron is oxidized with air and the base is calcium oxide or calcium hydroxide.

Following removal of iron and silica, in precipitation step 1120, additional base is added to cause the precipitation of manganese and zinc. Manganese and zinc precipitates are collected by known means and, in step 1130, dissolved in an ammonium sulfate solution. Optionally, the ammonium sulfate solution that includes manganese and zinc can be purified. In certain embodiments, remaining brine solution from precipitation step 1120, from which manganese and zinc have been removed, can then be reinjected into the geothermal well from which the brine was originally removed.

The ammonium sulfate solution is filtered in step 1140 to produce a manganese containing solution and zinc precipitates. The solution is passed to zinc solvent extraction step 1150 to recovery remaining zinc. Zinc precipitates are electrochemically converted to zinc metal in step 1160. Manganese containing solution from the filtration step is provided to a reduction step 1170 wherein the manganese containing solution is contacted with a reducing agent, such as sulfur dioxide. In step 1180, reduced manganese can be recovered from solution by electrolytically depositing manganese dioxide, such as by electrowinning.

Optionally, as shown by dashed line, following recovery of zinc in electrochemical recovery step 1160, a sulfuric acid-rich solution can be recycled to zinc extraction step 1150. Similarly, as shown by the dashed line, following the electrochemical recovery of manganese in step 1180, the remaining brine solution can be recycled to either precipitation step 1120 or dissolution step 1130.

In certain embodiments of the present invention, as described herein, solid zinc oxide produced electrochemically or by ion exchange extraction can be dissolved in various acids for the production of zinc compounds. For example, in one embodiment, zinc oxide can be added to hydrochloric acid to form solid zinc chloride. Solid zinc chloride can then be separated by filtration. In certain embodiments, zinc chloride can be isolated from solution by removing liquid by evaporation, spray drying, or other known methods. In an alternate embodiment, zinc oxide can be added to hydrobromic acid to form zinc bromide. Alternatively, zinc oxide can be added to sulfuric acid to form zinc sulfate. Alternatively, zinc oxide can be added to methylsulfonic acid to form zinc methylsulfonate. In certain embodiments, to facilitate precipitation of the various zinc compounds, a portion of the solution can be evaporated, or zinc compound can be separated by spray drying. In certain embodiments, recovered solid zinc compounds can be washed with minimal water and dried.

Production of Zinc Chloride

Various methods have been described herein for the production of or recovery of various zinc containing solutions, such as zinc chloride or zinc hydroxide. In the following description for the production of purified zinc chloride or zinc sulfate, it is understood that any of the processes for the production of or recovery of zinc chloride or zinc hydroxide can be employed, with or without the other steps that are described in the process.

In certain embodiments, zinc chloride can be produced from a zinc hydroxide precipitate. In general, zinc is provided as a zinc chloride solution. The zinc chloride can then be precipitated as zinc hydroxide by contacting the zinc containing solution with an alkali metal hydroxide or alkaline earth hydroxide, such as sodium hydroxide or calcium hydroxide. Generally, to prevent co-precipitation of the corresponding metal chloride, for example calcium chloride, less than a stoichiometric amount of the hydroxide is added. In certain embodiments, approximately 0.9 hydroxide equivalents are added, in alternate embodiments approximately 0.95 hydroxide equivalents are added.

In certain embodiments, the concentration of the metal hydroxide is between about 3.25 g/L and about 3.75 g/L, alternatively between about 3.5 g/L and 4 g/L, alternatively between about 3.75 g/L and about 4.25 g/L. In certain embodiments, the metal hydroxide is a 3.5 g/L solution of calcium hydroxide. Alternatively, the metal hydroxide is a 4 g/L solution of calcium hydroxide.

The zinc hydroxide can be collected by filtration or other known means and dried. The dried zinc hydroxide can then be dissolved in hydrochloric acid to form a zinc chloride solution. The water can be evaporated to produce a zinc chloride solid that can be collected by filtration and dried.

Production of Zinc Sulfate

In certain embodiments, zinc sulfate can be produced from a zinc hydroxide precipitate. Generally, a stoichiometric amount of a calcium hydroxide solution is added to a zinc containing solution to precipitate the zinc as zinc hydroxide. It is understood that in certain other embodiments, an alternate hydroxide, such as for example, an alkali metal hydroxide or alkaline earth metal hydroxide, or ammonium hydroxide can be used. In certain embodiments, the calcium hydroxide solution can have a concentration of between about 3 g/L and 5 g/L, alternatively between about 4 and 4.5 g/L, alternatively about 4.5 g/L. Generally, to facilitate maximum recovery of zinc from the zinc containing solution, at least 0.9 equivalents of calcium hydroxide are contacted with the solution, alternatively at least about 0.95 equivalents, alternatively at least about 1 equivalent. In certain embodiments, about 1.05 equivalents of the calcium hydroxide are contacted with the zinc containing solution.

The precipitated zinc hydroxide can be collected by filtration, or other known means, dried and then dissolved in sulfuric acid. The sulfuric acid can have a concentration of up to about 18 M, alternatively between about 1 and 6 M, alternatively between about 6 and 12 M, alternatively between about 12 and 18 M. Following the step of dissolving the zinc hydroxide with sulfuric acid, the water is evaporated and the solid product dried to produce a zinc sulfate solid.

The zinc product can have a purity of at least about 95% by weight, alternatively at least about 97% by weight, alternatively at least about 98% by weight, alternatively at least about 99% by weight, alternatively at least about 99.5% by weight. The zinc product can have a cadmium content of less than about 90 ppm, and a can also have a lead content of less than about 15 ppm, and an arsenic content of less than about 12 ppm.

Purification of $ZnCl_2$ Solution

In certain embodiments, the zinc chloride solution can be purified to remove cadmium and lead, and optionally copper, that may be present. For example, zinc dust can be added to the zinc chloride at a pH ranging from about 4-5, alternatively between about 4.25 and 4.5, to remove lead and cadmium that are present as precipitates. The purification can be performed either after the initial recovery of the zinc chloride containing solution, after a reverse osmosis step, or after the preparation of zinc chloride following dissolution of the zinc hydroxide with HCl. In certain embodiments, between about 1 and 10 equivalents of zinc dust can be added, based upon the amount of cadmium, lead and copper present in the zinc chloride solution.

EXAMPLES

Example 1

Carbonation of Sodium Hydroxide. Carbonation of sodium hydroxide was carried out using a 3 liter jacketed reactor with a heating system (manufactured by Syrris Reactor Systems, UK). The reaction was carried out at a temperature of about 95° C. using a one liter of a 9.5 M solution of sodium hydroxide (27.5% solids). Carbon dioxide was supplied for about 1 hour at the rate of 3 L/min. (totaling approximately 8 moles, approximately 1.7 molar equivalents) to ensure the complete conversion of sodium hydroxide. At the end of the carbonation of the sodium hydroxide solution, a clear solution of sodium carbonate was obtained, at which point the carbonation reaction was stopped and heating of the sodium carbonate solution was continued for few minutes. To the clear solution, lithium carbonate seeds were added before reacting it with a lithium chloride solution (404 g lithium chloride in 1000 mL). Experimental yield was 95%. Yields varied for other similar reactions depending upon experimental conditions and were as high as about 100% in some cases. The purity of the isolated lithium carbonate was approximately 96.6% before washing.

Before the first washing of the product stream, the lithium carbonate had the following impurities: Na (71 mg/kg), Ca (2.8 mg/kg), Mg (2.1 mg/kg), Fe (0.3 mg/kg), Ba (0.1 mg/kg), Mn (0.08 mg/kg), and Sr (0.03 mg/kg), for a purity of about 78.4%. After washing with approximately 2-3 volume equivalents of water, the sodium concentration is reduced to undetectable levels and the lithium carbonate had the following impurities: Mg (5.9 mg/kg), Ca (2.9 mg/kg), Ba (0.4 mg/kg), Fe (0.4 mg/kg), Mn (0.07 mg/kg), and Sr (0.07 mg/kg), for a purity of greater than 99%.

The washing conditions may affect the amount of sodium carbonate/chloride entrained in the lithium carbonate product.

Example 2

The electrolysis process converts a purified, concentrated lithium chloride solution into a concentrated lithium hydroxide solution for subsequent conversion to lithium bicarbonate. The limiting factor determining the efficiency of the electrochemical cell is the concentration of lithium hydroxide in the catholyte, due to back-migration of hydroxide across the membrane. Therefore, the experiment was designed wherein the electrochemical cell was operated at four different hydroxide concentrations to map the effect of the lithium hydroxide concentration and determine the maximum concentration that could be prepared. The experiment was designed to measure the current efficiency and energy utilization of the dialysis process as a function of hydroxide concentration. Within the electrochemical cell, under an applied field, lithium cations migrate from the anolyte to catholyte, while water present is electrolyzed to $H_2$ and $OH^-$ at the cathode. In theory, each electron passed in the external circuit corresponds to an increase of one lithium hydroxide molecule in the catholyte, leading to an increase in concentration of lithium hydroxide with time. The main inefficiency in the process, the back migration of $OH^-$ ions from catholyte to anolyte, is dependent on the $OH^-$ concentration of the catholyte. Therefore, the experiments reported here were performed with the intention of maintaining the $OH^-$ concentration of the catholyte constant by adding water at a known rate. The efficiency of the reaction was measured by comparing the actual rate of addition of water with the theoretical addition.

Example 3

Electrolytic Production of Lithium Hydroxide from Lithium Chloride

Experimental Set-Up. The electrolysis system consisted of the electrolysis cell having anolyte and catholyte flow systems. Electrolysis of lithium chloride solutions was carried out using an FM01 electrolyzer (a scale model of the FM21 electrolyzer used commercially in the chlor-alkali industry) manufatured by ICI. The electrolyzer included lantern blade-style electrodes (anode: ruthenium oxide coated titanium; and cathode: nickel), and a Nafion® 982 membrane. The active surface area of each electrode was about 64 cm$^2$ (4×16 cm), and the cell gap (distance measured anode to cathode) was between about 12-13 mm. The FM01 electrolyzer was operated with the flow parallel to the 16 cm direction (as compared with a flow direction parallel to the 4 cm dimension, as it is intended to be operated), as this improved the management of chlorine and hydrogen gasses evolved from the electrodes. In addition, although anolyte and catholyte flows are normally fed from opposite sides of the cell, in the present experiment, the anolyte and catholyte were fed from the same side of the electrochemical cell.

The anolyte flow system included a feed tank, pump, degassing tank, chlorine scrubber, and collection tank. A lithium chloride solution having a concentration of about 21% by weight was placed in the anolyte feed tank and heated to about 90° C. The heated solution was pumped into the anode chamber of the cell in a single pass mode at a flow rate of about 20 cm$^3$/min, corresponding to a face velocity of about 0.13 cm/s. Upon exiting the cell, the lithium chloride solution and entrained chlorine gas (produced at the anode) were passed through into a degassing tank was equipped with a chlorine scrubber, to remove the chlorine. The lithium chloride solution was then pumped to a collection tank for storage.

The catholyte flow system included a feed tank, pump, and water feed system. Lithium hydroxide was placed in the feed tank and heated to about 95° C. and fed to the cathode chamber of the electrochemical cell in recirculating mode at a flow rate of about 50 mL/min, corresponding to a face velocity of about 0.33 cm/s. Water was added continuously to the system using a peristaltic pump to maintain a constant lithium hydroxide concentration. The rate of addition was monitored by the weight loss of the water tank. Nitrogen was bubbled through the catholyte recirculation tank to minimize the reaction of lithium hydroxide and carbon dioxide from the air.

Table 1 summarizes the experimental conditions used in tests to determine the effect of the concentration of the catholyte.

TABLE 1

Experimental parameters for electrolysis experiments.

| Parameter | Value |
|---|---|
| Current Density | 3000 A/m$^{-2}$ |
| Electrode Area | 64 cm$^2$ |
| Anolyte Volume | 60 cm$^3$ |
| Catholyte Volume | 60 cm$^3$ |
| LiCl Inlet Concentration | 21 wt % |
| LiCl Inlet pH | 0.5-0.7 |
| Temperature | 90° C. |
| Time of Operation | 2-3 hours |
| Anolyte (LiCl) Flow Velocity | 0.13 cm/s |
| Catholyte (LiOH) Flow Velocity | 0.33 cm/s |

During operation of the electrochemical cell, samples were collected at the catholyte inlet and outlet and anolyte outlet ports every 30 minutes. Cell voltage was monitored at the cell terminals using a handheld multimeter. The difference between the inlet and outlet catholyte hydroxide concentrations and the cell voltage were used to calculate the efficiency and energy consumption of the cell.

Results

Figure 5:
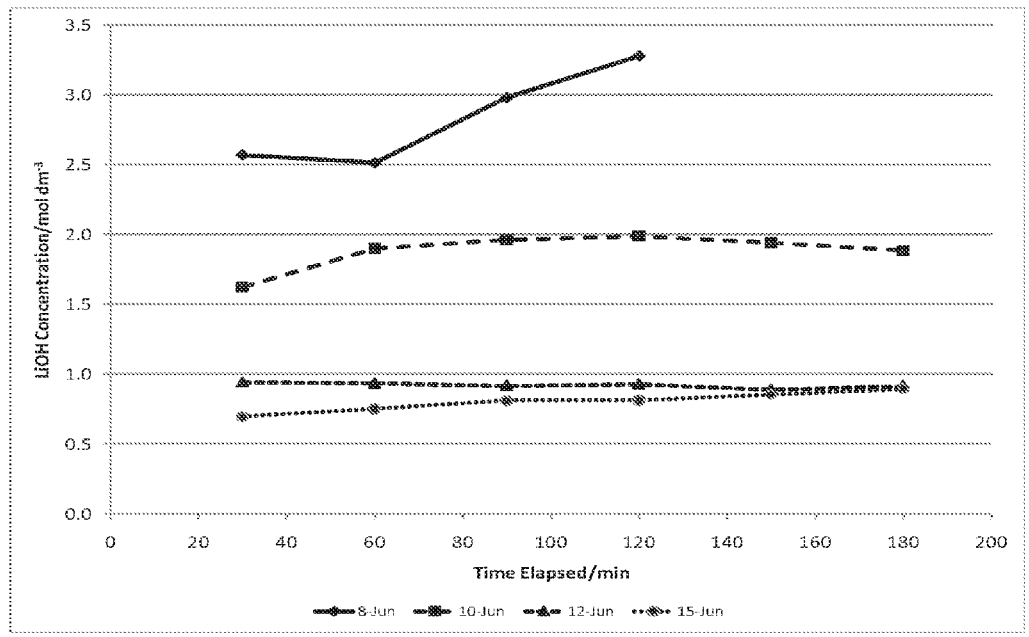
FIG. 5 shows the compares of lithium hydroxide concentration for multiple embodiments of the present invention.

The results of the concentration of the catholyte are summarized in Table 2 and are shown in FIGS. 5 to 8. FIG. 5 shows the difficulty in maintaining constant lithium hydroxide concentration based solely by adjusting water addition rate, in the absence of real-time measurements of the hydroxide concentration, because water can be consumed or added to the catholyte by a variety of mechanisms, including electrolysis, evaporation, and migration across the membrane with lithium cations. In general, data suggest that the higher the initial concentration of lithium hydroxide, the more difficult the task of maintaining constant concentration through water addition.

Figure 6:
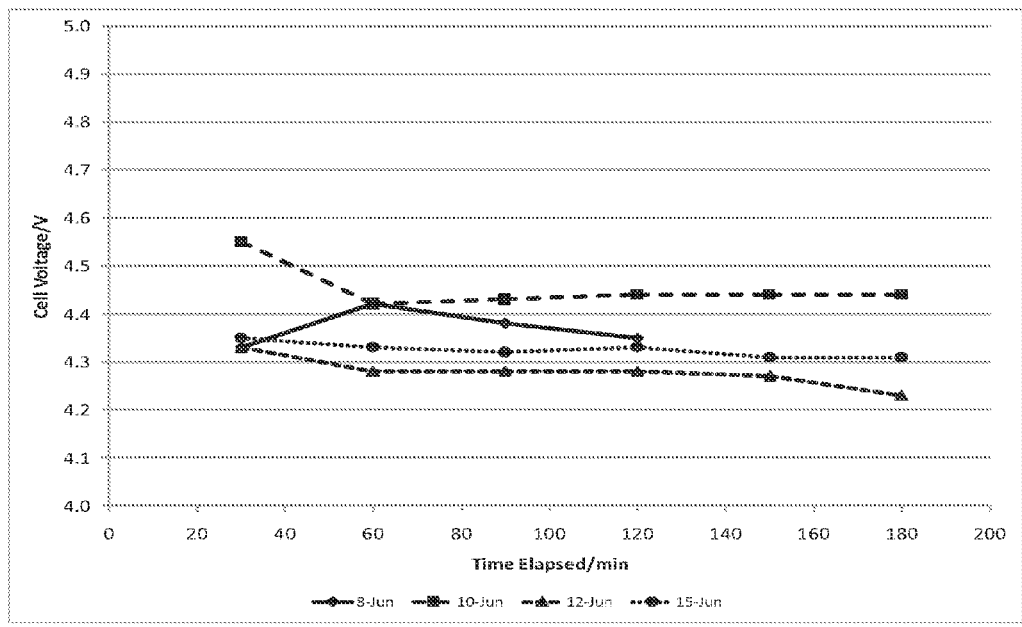
FIG. 6 shows variation of cell voltage of an electrolysis cell during preparation of lithium hydroxide in one embodiment of the present invention.

Cell voltage was maintained at approximately 4.3-4.4 V for all experimental runs. FIG. 6 shows that cell voltage is relatively independent of hydroxide concentration, and implies energy consumption is largely driven by electrical efficiency of the electrode and membrane reactions. The cell gap in the FM01 electrolyzer used in this experiment (12-13 mm) is large compared to the cell gap typically employed in commercial cells (2-3 mm), so a commercial cell would be expected to have a lower cell voltage than those measured here.

Figure 7:
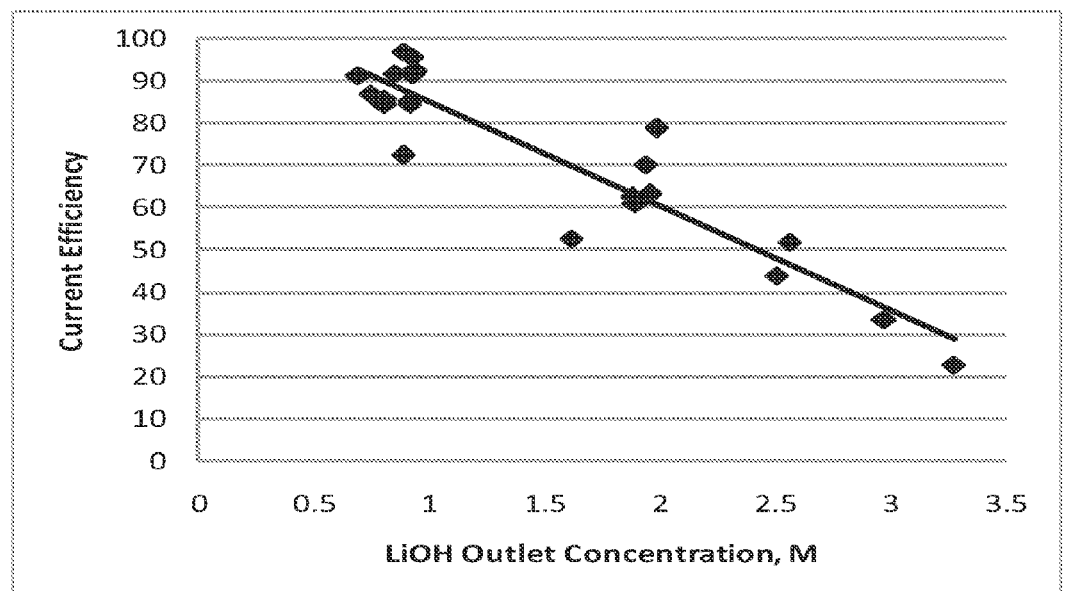
FIG. 7 shows lithium hydroxide concentration as a function of current efficiency in one embodiment of the present invention.
Figure 8:
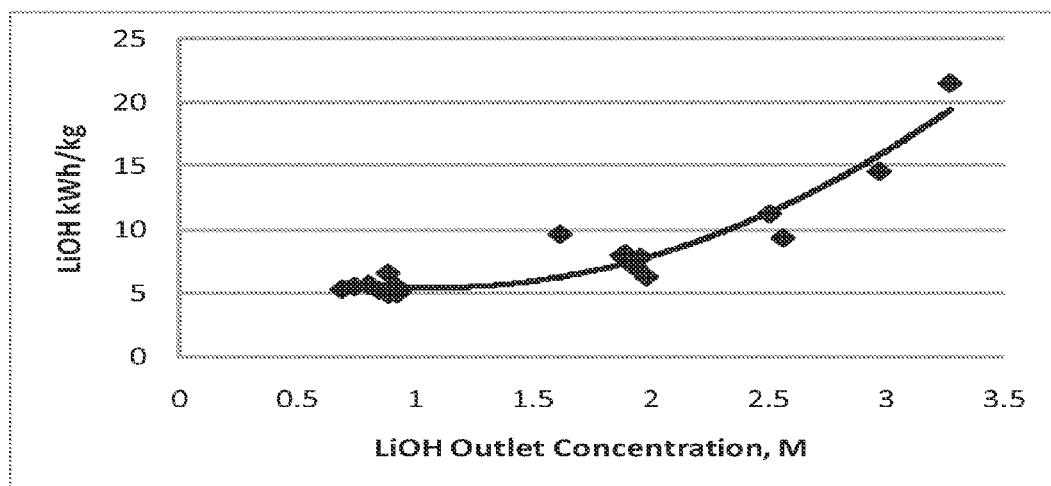
FIG. 8 shows energy consumption for production of lithium hydroxide in one embodiment of the present invention.

FIG. 7 shows that current efficiency decreases with increasing lithium hydroxide concentration. Without wishing to be bound by any one theory, it is believed this decrease in current efficiency may be due to increased back-migration of hydroxide anions across the membrane from the catholyte to anolyte as the lithium hydroxide concentration increases. As shown in FIG. 8, this also results in increased energy consumption, because all experiments were performed at the same current density and the cell voltage was essentially constant. The experiments suggest that a preferred concentration of lithium hydroxide in the electrochemical cell may be between about 1-2 molar.

Table 2 summarizes the test results. As shown, lithium hydroxide production efficiency increases as lithium hydroxide concentration decreases, having an efficiency of up to about 80-88% for lithium hydroxide solutions having a concentration of about 1 molar (2.4% by weight). Cell voltage is relatively independent of lithium hydroxide concentration, so the efficiency also drives the energy requirement, which decreases to about 5 kWh/kg lithium hydroxide produced at a concentration of about 1 molar. Lithium hydroxide production rate is greatest with lower initial concentrations of lithium hydroxide.

TABLE 2

Summary of Results.

| Test | LiOH conc. (Start) M | LiOH conc. (Final) M | Cell Voltage V | Water Added g/min | Efficiency % | Production Rate* kg LiOH/m$^2$/hr | Energy kWh/kg LiOH |
|---|---|---|---|---|---|---|---|
| 1 | 2.57 | 3.28 | 4.37 | 0.5 | 35 | 0.94 | 15 |
| 2 | 1.62 | 1.88 | 4.45 | 5 | 65 | 1.74 | 8 |
| 3 | 0.94 | 0.92 | 4.28 | 11 | 80 | 2.14 | 5 |
| 4 | 0.69 | 0.89 | 4.33 | 10 | 88 | 2.36 | 5.3 |

*Calculated (Production rate = 2.68 kg LiOH/m$^2$/hr × efficiency).

Example 4

Carbonation

Chemical Reactor. Lithium hydroxide was carbonated using a 3 L Syrris automated batch reactor system (Syrris Ltd. 27 Jarman Way, UK), having controls for sensing pH, temperature, reagent addition, and sample extraction. The electrolytic studies detailed above suggest that electrolysis of lithium chloride could at most generate 1 molar or 2.4 wt % lithium hydroxide solution. Indeed, this concentration has been found to be ideal for conducting carbonation studies without clogging issues under our experimental conditions.

Carbonation Reaction Kinetics. Carbonation reaction kinetics of lithium hydroxide were determined by monitoring pH and metal ion concentration in solution (using Atomic Absorption) as the reaction progressed. Approximately 84 g of lithium hydroxide monohydrate was dissolved in 2000 mL of water to prepare a solution having a concentration of about 1 molar (about 2.4% by weight). The reactor jacket was heated using a 30:70 water-glycol mixture and the temperature of the lithium hydroxide solution was maintained at about 95° C. The solution was stirred at 250

RPM with a mechanical stirrer constantly during the carbonation. The carbonating gas tube was maintained at a depth of at least 6 cm in the caustic solution to begin with and the gas flow rate was continuously monitored using a flow meter (Matheson Tri-Gas, USA). As carbonation progressed, pH of the solution increased slightly and completion of the reaction was determined by sudden drop in pH of the solution, soon after the carbon dioxide flow to the reactor was stopped. The drop in pH coincides with the formation of lithium bicarbonate, which is unstable at higher temperatures. Therefore, the heating/stirring of the solution was continued to decompose lithium bicarbonate that had formed into lithium carbonate. Decomposition of lithium bicarbonate results in increased pH which stabilized over time. Lithium ion concentration was monitored during the reaction and showed that excess carbonation of the solution can lead to bicarbonate formation.

During carbonation, a slight molar excess of carbon dioxide was added to the lithium hydroxide solution to account for poor mixing of the carbon dioxide into the lithium hydroxide solution. After completion of the carbonation reaction, the solution was hot filtered because lithium carbonate solubility in water decreases at increased temperatures. Filtered solids were first dried at about 60° C. for about 18 hours, and were then dried at about 120° C. for about 24 hrs to ensure conversion of any residual lithium bicarbonate present in the solids back to lithium carbonate. The carbonation reaction was repeated several times with a 1 molar lithium hydroxide solution under slightly different experimental conditions, and both with and without lithium carbonate seeds. Results are shown in Table 3. Seeding of lithium hydroxide solution with lithium carbonate crystals improved yields. At higher carbon dioxide flow rates (e.g., at 3 L/min and greater), yield of the carbonation reaction remained high. As shown in Table 3, carbon dioxide feed was maintained at about 2 L/min, although total carbon dioxide added varied between about 1.25 and 2.5 moles (i.e., between about 0.625 and 1.25 molar equivalents). Experiment 1 in Table 3 included addition of nitrogen gas to the carbonation vessel. Experiments 3-5 in Table 3 included addition of between about 0.6% and 1.2% by weight lithium hydroxide seeds. Results show that increased reaction rate can allow for a reduction in the reactor size, and reduced overall cost associated therewith.

TABLE 3

Carbonation Reaction of a 2.4% by Weight Solution of LiOH[†]

| Exp. | Reaction Conditions | Overall Carbonation Yield (%)[#] | Lithium Carbonate Solids Recovered (%) |
|---|---|---|---|
| 1 | $CO_2$ (2 LPM, 2.5 moles) + $N_2$ (3.7 LPM) | 100.0% | 57%* |
| 2 | $CO_2$ (2 LPM, 1.9 moles) | 93% | 73% |
| 3 | $CO_2$ (2 LPM, 1.5 moles) + 1.2% $Li_2CO_3$ seeds | 99% | 82% |
| 4 | $CO_2$ (2 LPM, 1.25 moles) + 0.6% $Li_2CO_3$ seeds | 93% | 78% |
| 5 | $CO_2$ (3 LPM, 1.3 moles) + 1.2% $Li_2CO_3$ seeds | 96% | 82% |

[†]Prepared by mixing 84 g lithium hydroxide (LiOH•H$_2$0) in 2 L water.
[#]Overall yield includes the amount of lithium carbonate/bicarbonate dissolved in solution and deposited inside the reactor walls.
*excessively carbonated and filtered without converting $LiHCO_3$ back into $Li_2CO_3$.

Zinc and Manganese Recovery

For zinc and manganese recovery testing purposes, a synthetic brine was employed for examples 5-7 having metal concentrations of approximately the following: 1600 mg/L Fe; 96 mg/L Si; 2500 mg/L Mn; 790 mg/L Zn; 290 mg/L Li; 41,000 mg/L Ca; 27,000 mg/L K; 85,500 mg/L Na; and 185 mg/L Sr.

Example 5

Approximately 1.22 L of synthetic brine was placed in a 2 L reactor and maintained at a temperature of between about 90-95° C. and sparged with air at a rate of about 2.25 L/minute. Initial pH of the brine was about 4.89. To the reaction approximately 14 g of a 20% slurry of calcium hydroxide added. After addition of the slurry, a pH of about 2.85 was achieved, which gradually increased to approximately 3.56 after about 10 minutes. After 40 minutes, at which time the pH was about 2.9, approximately 5.33 g of a 20% slurry of calcium hydroxide was added, which raised the pH to about 4.07. The brine and calcium hydroxide slurry were mixed for approximately 30 min, during which time pH decreased to approximately 4.0, at which time approximately 21.22 g of the 20% slurry of calcium hydroxide was added. Addition of the calcium hydroxide slurry increased pH to approximately 4.5. The mixture was stirred for about another 20 minutes, after which approximately 28.54 g of calcium hydroxide slurry was again added, and pH increased to approximately 5.18. The reaction was allowed to stir for an about additional 30 minutes, and solid was collected and weighed. The solid includes approximately 99.6% of the iron present in the brine and approximately 99.9% of the silica. Additionally, approximately 49.2% of the manganese present in the brine was removed.

Example 6

Approximately 1.32 L of the synthetic brine was placed in a 2 L reactor and maintained at a temperature of between about 90-95° C. and sparged with air at a rate of about 2.25 L/minute. The reaction was stirred for approximately 60 minutes and pH of the solution was monitored. After about 60 minutes, a pH of about 2.05 was achieved. To the brine solution was added approximately 9.73 g of a 20% slurry of calcium hydroxide, which raised the pH to about 5.4. The brine and the calcium hydroxide slurry were mixed for approximately 30 min, during which time pH decreased to approximately 3.4, at which time approximately 2.56 g of the 20% slurry of calcium hydroxide was added. The addition of the slurry increased pH to approximately 4.9. The mixture was stirred for about another 20 minutes, after which approximately 1.21 g of the calcium hydroxide slurry was again added, and pH increased to approximately 5.3. The reaction was allowed to stir for about an additional 70 minutes, and the solid was collected and weighed. The solid includes approximately 98% of the iron present in the brine and approximately 99% of the silica. Additionally, approximately 2% of the manganese present in the brine was removed.

Example 7

Approximately 1.32 L of the synthetic brine was placed in a 2 L reactor and maintained at a temperature of between about 90-95° C. and sparged with air at a rate of about 2.25 L/minute. The reaction was stirred for approximately 60 minutes and pH of the solution was monitored. After about 22 minutes, pH of about 2.52 was achieved. To the brine solution was added approximately 9.7 g of a 20% slurry of calcium hydroxide, which raised the pH to about 5.56. The brine and the calcium hydroxide slurry were mixed for approximately 13 min, during which time pH decreased to approximately 4.27, at which time approximately 1.9 g of the 20% slurry of calcium hydroxide was added. The addition of the calcium hydroxide slurry increased pH to approximately 5.2. The mixture was stirred for about another 5 minutes, during which time pH decreased to approximately 4.49. Approximately 2.25 g of calcium hydroxide slurry was again added, and pH increased to approximately 5.17. The reaction was allowed to stir for about an additional 110 minutes, during which time pH was maintained at between about 5.13 and 5.17, and solid, which includes approximately 95.6% of the iron present in the brine and approximately 88.5% of the silica, was collected and weighed. Additionally, approximately 2% of the manganese present in the brine was removed.

Example 8

A synthetic brine having a composition that includes about 330 mg/L Li; 2400 mg/L Mn; 740 mg/L Zn; 40,000 mg/L Ca; 26,000 mg/L K; 91,000 mg/L Na; 180 mg/L Sr and 0.8 mg/L Fe was placed in a 2 L reactor and maintained at a temperature of between about 90-95° C. and sparged with air at a rate of about 2.25 L/minute. Initial pH was approximately 5.5. After sparging the reactor with air, calcium hydroxide slurry was added sufficient to bring pH to approximately 6.6. Additional calcium hydroxide slurry was added over about the next 180 minutes at various intervals. During the addition of the calcium hydroxide slurry, pH increased from an initial value of about 6.6 to 8. A precipitate was collected which included zinc and manganese. The process recovered about 95.2% of the manganese present in the brine, about 94.6% of the zinc present in the brine, about 0.8% of the calcium present in the brine, and about 75% of the iron present in the brine. Due to the high recovery of iron by this process, the need for removal is confirmed.

Example 9

A synthetic brine having a composition that includes about 326 mg/L Li; 2640 mg/L Mn; 886 mg/L Zn; 41,000 mg/L Ca; 28,000 mg/L K; 84,000 mg/L Na; 180 mg/L Sr and 0.3 mg/L Fe was placed in a 2 L reactor and maintained at a temperature of between about 90-95° C. and sparged with air at a rate of about 2.25 L/minute. After sparging the reactor with air, calcium hydroxide slurry was added in a single dosage sufficient that pH of the brine solution was measured immediately after addition of the calcium hydroxide slurry and was about 7.6. During the stirring and sparging of the reaction, pH increased from an initial value of about 7.6 to 7.9 after approximately 15 minutes, and then decreased gradually to about 7.5. A precipitate was collected which included zinc and manganese. The process recovered about 100% of the manganese present in the brine, about 99.9% of the zinc present in the brine, and about 8% of the lithium present in the brine.

Zinc Sulfate Production

To a zinc chloride containing solution having a concentration of about 3.5 g $ZnCl_2$/L was added a stoichiometric amount of 4.5 g/L solution of $Ca(OH)_2$. The resulting solid was isolated by filtration, and dried. The solid was then dissolved in a slight excess of 18.4M $H_2SO_4$. The resulting zinc sulfate monohydrate was recovered by evaporation producing a solid having a purity of at least about 99.99% by weight, and a composition as provided in Table 4 below.

TABLE 4

| Element | Concentration |
|---------|---------------|
| As | 11 ppm |
| Cd | 84 ppm |
| Fe | 1 ppm |
| Mo | 1 ppm |
| Pb | 12 ppm |
| Zn | 36% |

Zinc Chloride Production

To a zinc chloride containing solution having a concentration of about 3.5 g $ZnCl_2$/L was added a less than stoichiometric amount of either a 3.5 g/L solution of $Ca(OH)_2$ or a 4.0 g/L solution of $Ca(OH)_2$. The 3.5 g/L solution resulted in the precipitation of about 93.4% of the zinc present in the zinc chloride solution, and the 4.0 g/L solution resulted in the precipitation of about 99.9% of the zinc chloride in solution. The resulting solid was isolated by filtration, and dried. The solid was then dissolved in a slight excess of 12M HCl. The resulting zinc chloride solution had a composition as provided in Table 5 below.

TABLE 5

| | $ZnCl_2$ solution from 3.5 g/L $Ca(OH)_2$ | $ZnCl_2$ solution from 4 g/L $Ca(OH)_2$ |
|---|---|---|
| $CaCl_2$ % | 0.3857 | 1.1711 |
| $ZnCl_2$ % | 64 | 53 |
| Cd % | 0.0027 | 0.0052 |
| Cu % | 0.0007 | 0.0002 |
| Fe % | 0.0000 | 0.0000 |
| Mn % | 0.0657 | 0.0945 |
| Pb % | 0.0469 | 0.0380 |

As is understood in the art, not all equipment or apparatuses are shown in the figures. For example, one of skill in the art would recognize that various holding tanks and/or pumps may be employed in the present method.

The singular forms "a," "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

We claim:

1. A method for the preparation of zinc chloride from a geothermal brine solution, the method comprising the steps of:
   treating the geothermal brine to reduce both silica and iron content, thereby generating a depleted brine solution comprising lithium chloride;
   contacting the depleted brine solution and a sodium hydroxide solution in a reaction vessel to produce a solution comprising lithium hydroxide and a hydrochloric acid by-product stream, wherein said sodium hydroxide solution is prepared by electrolyzing sodium chloride in an electrochemical cell, said electrochemical cell comprising an anode, a cathode, and a semipermeable membrane separating an anode chamber and a cathode chamber;
   contacting the solution comprising lithium hydroxide with carbon dioxide gas in a reaction vessel to produce a solution that includes lithium carbonate;
   separating a product stream from the reaction vessel to provide a lithium carbonate product and a lithium depleted brine stream;
   extracting zinc from the lithium depleted brine stream with a solid extraction media;
   recovering zinc from the solid extraction media to produce a zinc salt solution;
   contacting the zinc salt solution with an alkali metal hydroxide or alkaline earth hydroxide to produce a solid zinc hydroxide;
   recovering solid zinc hydroxide;
   dissolving the solid zinc hydroxide with hydrochloric acid to produce an aqueous zinc chloride solution; and
   evaporating water from the aqueous zinc chloride solution to produce a purified zinc chloride solid, said purified zinc chloride solid having a purity of at least about 99% by weight.

2. The method of claim 1 wherein the step of contacting the zinc salt solution with an alkali metal hydroxide or alkaline earth hydroxide comprises contacting the zinc salt solution with between about 0.9 and 0.95 hydroxide equivalents.

3. The method of claim 1 wherein the alkaline earth hydroxide is calcium hydroxide.

4. The method of claim 3 wherein the concentration of the calcium hydroxide is between about 3.25 g/L and 3.75 g/L.

5. The method of claim 3 wherein the concentration of the calcium hydroxide is between about 3.45 g/L and 4.25 g/L.

6. The method of claim 1 further comprising supplying at least a portion of the hydrochloric acid byproduct stream to the step of dissolving the zinc hydroxide.

7. A method for the preparation of zinc sulfate from a geothermal brine solution, the method comprising the steps of:
   treating the geothermal brine to reduce both silica and iron content, thereby generating a depleted brine solution comprising lithium chloride;
   contacting the depleted brine solution and a sodium hydroxide solution in a reaction vessel to produce a solution comprising lithium hydroxide and a hydrochloric acid by product stream, wherein said sodium hydroxide solution is prepared by electrolyzing sodium chloride in an electrochemical cell, said electrochemical cell comprising an anode, a cathode, and a semipermeable membrane separating an anode chamber and a cathode chamber;
   contacting the solution comprising lithium hydroxide with carbon dioxide gas in a reaction vessel to produce a solution that includes lithium carbonate;
   separating a product stream from the reaction vessel to provide a lithium carbonate product and a lithium depleted brine stream;
   extracting zinc from the lithium depleted brine stream with a solid extraction media;
   recovering zinc from the solid extraction media to produce a zinc salt solution;
   contacting the zinc salt solution with an alkali metal hydroxide or alkaline earth hydroxide to produce a solid zinc hydroxide;
   recovering solid zinc hydroxide;
   dissolving the solid zinc hydroxide with sulfuric acid to produce an aqueous zinc sulfate solution; and
   evaporating water from the aqueous zinc sulfate solution to produce a purified zinc sulfate solid, said purified zinc sulfate solid having a purity of at least about 99% by weight.

8. The method of claim 7 wherein the step of contacting the zinc salt solution with an alkali metal hydroxide or alkaline earth hydroxide comprises contacting the zinc salt solution with between about 0.9 and 0.95 hydroxide equivalents.

9. The method of claim 7 wherein the alkaline earth hydroxide is calcium hydroxide.

10. The method of claim 9 wherein the concentration of the calcium hydroxide is between about 3.25 g/L and 3.75 g/L.

11. The method of claim 9 wherein the concentration of the calcium hydroxide is between about 3.45 g/L and 4.25 g/L.

* * * * *